United States Patent
Itano et al.

(10) Patent No.: US 10,988,652 B2
(45) Date of Patent: Apr. 27, 2021

(54) METHOD FOR USING A MIXTURE OF FLUORINATED HYDROCARBONS AS A REFRIGERANT, AND A REFRIGERATION UNIT USING THE MIXTURE AS A REFRIGERANT

(71) Applicant: DAIKIN INDUSTRIES, LTD., Osaka (JP)

(72) Inventors: Mitsushi Itano, Osaka (JP); Yasufu Yamada, Osaka (JP); Tatsumi Tsuchiya, Osaka (JP); Hitomi Kuroki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 164 days.

(21) Appl. No.: 15/556,175

(22) PCT Filed: Mar. 27, 2017

(86) PCT No.: PCT/JP2017/012277
§ 371 (c)(1),
(2) Date: Jun. 22, 2018

(87) PCT Pub. No.: WO2018/142636
PCT Pub. Date: Aug. 9, 2018

(65) Prior Publication Data
US 2018/0298259 A1    Oct. 18, 2018

(30) Foreign Application Priority Data

Feb. 3, 2017  (JP) .............................. JP2017-018928

(51) Int. Cl.
*C09K 5/04*  (2006.01)
*F25B 30/02*  (2006.01)
(Continued)

(52) U.S. Cl.
CPC ................ *C09K 5/045* (2013.01); *F25B 1/00* (2013.01); *F25B 30/02* (2013.01); *F25B 41/26* (2021.01);
(Continued)

(58) Field of Classification Search
CPC .... C09K 5/045; C09K 2205/22; C09K 5/122; F25B 1/00; F25B 41/046; F25B 30/02; F25B 9/006
See application file for complete search history.

(56) References Cited

U.S. PATENT DOCUMENTS

| | | | |
|---|---|---|---|
| 8,168,077 B2 * | 5/2012 | Spatz | ..................... C09K 5/045 252/67 |
| 2003/0217565 A1 * | 11/2003 | Flynn | ..................... F25B 9/006 62/430 |

(Continued)

FOREIGN PATENT DOCUMENTS

| | | |
|---|---|---|
| EP | 0 811 670 | 12/1997 |
| EP | 0 509 673 | 11/2003 |

(Continued)

OTHER PUBLICATIONS

D. S. Godwin: "*Results of Soft-Optimized System Tests in ARI's R-22 Alternative Refrigerants Evaluation Program*", International Refrigeration and Air Conditioning Conference, Paper 217, Jan. 1, 1994, Retrieved from the internet: URL:https://pdfs.semanticscholar.org/8417/6f8863b90d46ebf74ce7a231e6df178db3e9.pdf [retrieved on Jun. 19, 2019].

(Continued)

*Primary Examiner* — Kun Kai Ma
(74) *Attorney, Agent, or Firm* — Wenderoth, Lind & Ponack, L.L.P.

(57) ABSTRACT

The present invention provides a method for using, as an alternative refrigerant for R404A that is currently widely (Continued)

used, a refrigerant that has, for example, a non-flammability similar to that of R404A, a refrigerating capacity that can replace that of R404A, a COP equal or superior to that of R404A, and a lower GWP than that of R404A, as a refrigerant for a cooling system; as well as a refrigeration unit using the refrigerant. The method uses a mixture of fluorinated hydrocarbons as a refrigerant, (1) the mixture comprising difluoromethane (R32), pentafluoroethane (R125) and 1,1,1,2-tetrafluoroethane (R134a) in amounts such that the sum of the concentrations thereof is 99.5 wt % or more; (2) the composition ratio of the fluorinated hydrocarbons contained in the mixture falling within a triangle having, as vertices, the following three points in a ternary composition diagram in which the sum of the concentrations of R32, R125, and R134a is 100 wt %, point A (R32/R125/R134a=37.3/17.0/45.7 wt %), point F (R32/R125/R134a=30.7/10.9/58.4 wt %), and point G (R32/R125/R134a=29.4/14.1/56.5 wt %); and (3) the mixture being used as a refrigerant in a cooling system comprising a heat exchanger in which a flow of the refrigerant and a flow of an external heat medium are counter flows.

24 Claims, 15 Drawing Sheets

(51) Int. Cl.
*F25D 21/06* (2006.01)
*F25B 1/00* (2006.01)
*F25B 41/26* (2021.01)

(52) U.S. Cl.
CPC ........ *F25D 21/06* (2013.01); *C09K 2205/122* (2013.01); *C09K 2205/22* (2013.01)

(56) References Cited

U.S. PATENT DOCUMENTS

| | | | | |
|---|---|---|---|---|
| 2006/0288724 | A1* | 12/2006 | Ambs | F25B 13/00 62/260 |
| 2008/0196877 | A1* | 8/2008 | Zeigler | F25B 13/00 165/202 |
| 2011/0108756 | A1* | 5/2011 | Tsuchiya | C09K 5/045 252/68 |
| 2014/0083214 | A1* | 3/2014 | Wu | A01N 65/00 73/866 |
| 2017/0174967 | A1 | 6/2017 | Itano et al. | |
| 2018/0017300 | A1* | 1/2018 | Shockley | F25D 21/008 |

FOREIGN PATENT DOCUMENTS

| | | | | |
|---|---|---|---|---|
| JP | 61-6566 | | 1/1986 | |
| JP | 02-075867 | | 3/1990 | |
| JP | 5-34049 | | 2/1993 | |
| JP | 9-324175 | | 12/1997 | |
| JP | 10-54618 | | 2/1998 | |
| JP | 2869038 | | 3/1999 | |
| JP | 11-94330 | | 4/1999 | |
| JP | 2013-32875 | | 2/2013 | |
| JP | 2016156001 | A * | 9/2016 | ............... C09K 5/04 |
| WO | 2016/132818 | | 8/2016 | |

OTHER PUBLICATIONS

Extended European Search Report dated Jul. 2, 2019 in corresponding European Patent Application No. 17875074.1.
International Search Report dated Jun. 20, 2017 International (PCT) Application No. PCT/JP2017/012277.
Xuechun et al., "Summary of Air Conditioning Defrost on Patented Technology", Henankeji-Zhishichanquan, pp. 33-35, 2016, with English Abstract.

* cited by examiner (a)

(b)

METHOD FOR USING A MIXTURE OF FLUORINATED HYDROCARBONS AS A REFRIGERANT, AND A REFRIGERATION UNIT USING THE MIXTURE AS A REFRIGERANT

TECHNICAL FIELD

The present invention relates to a method for using a mixture of fluorinated hydrocarbons (including a mixture consisting only of three basic components, i.e., difluoromethane (R32), pentafluoroethane (R125) and 1,1,1,2-tetrafluoroethane (R134a)), which is used as a refrigerant or the like, as a refrigerant for a cooling system, as well as a refrigeration unit using the mixture as a refrigerant. The mixture of fluorinated hydrocarbons may be used as an alternative refrigerant for known refrigerants R404A, R22, R407A, R407C, R407E, R407F, and the like.

BACKGROUND ART

Refrigerants recently used, for example, for air conditioners, refrigerating devices, and refrigerators are mixtures of fluorinated hydrocarbons that contain no chlorine in their molecular structures, such as difluoromethane ($CH_2F_2$, R32, boiling point: $-52°$ C.), pentafluoroethane ($CF_3CHF_2$, R125, boiling point: $-48°$ C.), 1,1,1-trifluoroethane ($CF_3CH_3$, R143a, boiling point: $-47°$ C.), 1,1,1,2-tetrafluoroethane ($CF_3CH_2F$, R134a, boiling point: $-26°$ C.), and 1,1-difluoroethane ($CHF_2CH_3$, R152a, boiling point: $-24°$ C.)

Among the above fluorinated hydrocarbons, a ternary mixed refrigerant of R32/R125/R134a in which the proportions thereof are 23/25/52 wt % (R407C), a ternary mixed refrigerant of R125/143a/R134a in which the proportions thereof are 44/52/4 wt % (R404A), etc., have been proposed, and R404A is currently widely used as a refrigerant for freezing and refrigerated storage (for example, Patent Literature 1 and 2).

However, the global warming potential (GWP) of R404A is very high, namely, 3922, which is equal to or higher than that of $CHClF_2$ (R22), which is a chlorine-containing fluorinated hydrocarbon. There is thus a demand to develop and use, as alternative refrigerants for R404A, a refrigerant and refrigerant composition that have, for example, a non-flammability similar to that of R404A, a refrigerating capacity that can replace that of R404A, a ratio of refrigerating capacity to power consumed in a refrigeration cycle (coefficient of performance (COP)) that is equal or superior to that of R404A, and a lower GWP than that of R404A.

CITATION LIST

Patent Literature

PTL 1: JP2869038B
PTL 2: U.S. Pat. No. 8,168,077

SUMMARY OF INVENTION

Technical Problem

An object of the present invention is to provide a method of using, as an alternative refrigerant for R404A that is currently widely used, a refrigerant that have, for example, a non-flammability similar to that of R404A, a refrigerating capacity that can replace that of R404A, a COP equal or superior to that of R404A, and a lower GWP than that of R404A, as a refrigerant for a cooling system; as well as a refrigeration unit using the refrigerant. The definition of non-flammability in the present specification conforms to U.S. ASHRAE Standard 34-2013.

Solution to Problem

Specifically, the present invention relates to the methods for using a mixture of fluorinated hydrocarbons as a refrigerant, and the refrigeration units using the mixture as a refrigerant detailed below.

1. A method for using a mixture of fluorinated hydrocarbons as a refrigerant,
   (1) the mixture comprising difluoromethane (R32), pentafluoroethane (R125) and 1,1,1,2-tetrafluoroethane (R134a) in amounts such that the sum of the concentrations thereof is 99.5 wt % or more;
   (2) the composition ratio of the fluorinated hydrocarbons contained in the mixture falling within a triangle having, as vertices, the following three points in a ternary composition diagram in which the sum of the concentrations of R32, R125, and R134a is 100 wt %,
   point A (R32/R125/R134a=37.3/17.0/45.7 wt %),
   point F (R32/R125/R134a=30.7/10.9/58.4 wt %), and
   point G (R32/R125/R134a=29.4/14.1/56.5 wt %); and
   (3) the mixture being used as a refrigerant in a cooling system comprising a heat exchanger in which a flow of the refrigerant and a flow of an external heat medium are counter flows.

2. A method for using a mixture of fluorinated hydrocarbons as a refrigerant,
   (1) the mixture comprising difluoromethane (R32), pentafluoroethane (R125) and 1,1,1,2-tetrafluoroethane (R134a) in amounts such that the sum of the concentrations thereof is 99.5 wt % or more;
   (2) the composition ratio of the fluorinated hydrocarbons contained in the mixture falling within a triangle having, as vertices, the following three points in a ternary composition diagram in which the sum of the concentrations of R32, R125, and R134a is 100 wt %,
   point A (R32/R125/R134a=37.3/17.0/45.7 wt %),
   point F (R32/R125/R134a=30.7/10.9/58.4 wt %), and
   point G (R32/R125/R134a=29.4/14.1/56.5 wt %); and
   (3) the mixture being used as a refrigerant in a cooling system having a heat exchanger in which the evaporation temperature of the refrigerant when a usage-side heat exchanger functions as an evaporator is 0° C. or less.

3. A method for using a mixture of fluorinated hydrocarbons as a refrigerant,
   (1) the mixture comprising difluoromethane (R32), pentafluoroethane (R125) and 1,1,1,2-tetrafluoroethane (R134a) in amounts such that the sum of the concentrations thereof is 99.5 wt % or more;
   (2) the composition ratio of the fluorinated hydrocarbons contained in the mixture falling within a triangle having, as vertices, the following three points in a ternary composition diagram in which the sum of the concentrations of R32, R125, and R134a is 100 wt %,
   point A (R32/R125/R134a=37.3/17.0/45.7 wt %),
   point F (R32/R125/R134a=30.7/10.9/58.4 wt %), and
   point G (R32/R125/R134a=29.4/14.1/56.5 wt %); and
   (3) the mixture being used as a refrigerant in a cooling system comprising a heat exchanger in which a flow of the refrigerant and a flow of an external heat medium are counter flows, and the evaporation temperature of the refrigerant when a usage-side heat exchanger functions as an evaporator being 0° C. or less.

4. The method according to any one of Items 1 to 3, wherein:
the cooling system comprises a refrigerant circuit comprising a compressor, a heat-source-side heat exchanger, an expansion mechanism, and a usage-side heat exchanger in this order;
the expansion mechanism is a temperature-sensitive expansion valve; and
the refrigerant circuit comprises a solenoid valve between the heat-source-side heat exchanger and the temperature-sensitive expansion valve, and the heat-source-side heat exchanger functions as a radiator and the usage-side heat exchanger functions as an evaporator.

5. The method according to any one of Items 1 to 4, wherein:
the cooling system comprises a refrigerant circuit comprising a compressor, a heat-source-side heat exchanger, an expansion mechanism, and a usage-side heat exchanger in this order;
the refrigerant circuit comprises a four-way switching valve for switching the flow of the refrigerant compressed by the compressor between the heat-source-side heat exchanger and the usage-side heat exchanger; and
the four-way switching valve is capable of switching normal-cycle operation in which the heat-source-side heat exchanger functions as a radiator and the usage-side heat exchanger functions as an evaporator, and reverse-cycle operation in which the heat-source-side heat exchanger functions as an evaporator and the usage-side heat exchanger functions as a radiator.

6. The method according to Item 4 or 5, wherein the cooling system performs off-cycle defrosting in which the operation of the compressor is stopped and a usage-side fan additionally provided in the usage-side heat exchanger is operated, under predetermined conditions.

7. The method according to any one of Items 4 to 6, wherein the cooling system further comprises a heating means for heating the usage-side heat exchanger, and performs heating defrosting in which the usage-side heat exchanger is heated by the heating means, under predetermined conditions.

8. The method according to Item 5, wherein the cooling system performs reverse-cycle hot gas defrosting by the reverse-cycle operation, under predetermined conditions.

9. The method according to any one of Items 4 to 8, wherein:
the refrigerant circuit comprises a bypass flow path having a first end connected to a discharge end of the compressor and a second end connected to an inflow end of the usage-side heat exchanger; and
the cooling system performs normal-cycle hot gas defrosting in which the refrigerant compressed by the compressor is introduced into the usage-side heat exchanger via the bypass flow path, under predetermined conditions.

10. The method according to any one of Items 1 to 9, wherein the composition ratio of the fluorinated hydrocarbons contained in the mixture falls within a quadrilateral having, as vertices, the following four points in a ternary composition diagram in which the sum of the concentrations of R32, R125, and R134a is 100 wt %,
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %).

11. The method according to any one of Items 1 to 9, wherein the composition ratio of the fluorinated hydrocarbons contained in the mixture falls within a triangle having, as vertices, the following three points in a ternary composition diagram in which the sum of the concentrations of R32, R125, and R134a is 100 wt %,
point A' (R32/R125/R134a=35.6/16.4/48.0 wt %),
point F' (R32/R125/R134a=30.4/11.5/58.1 wt %), and
point G (R32/R125/R134a=29.4/14.1/56.5 wt %).

12. The method according to any one of Items 1 to 9, wherein the composition ratio of the fluorinated hydrocarbons contained in the mixture falls within a quadrilateral having, as vertices, the following four points in a ternary composition diagram in which the sum of the concentrations of R32, R125, and R134a is 100 wt %,
point B' (R32/R125/R134a=33.7/14.6/51.7 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

13. The method according to any one of Items 1 to 12, wherein the mixture consists only of R32, R125, and R134a.

14. The method according to any one of Items 1 to 13, wherein the mixture is an alternative refrigerant for R404A (R125/R134a/R143a=44/4/52 wt %), which is a mixed refrigerant.

15. The method according to any one of Items 1 to 14, wherein the method is performed in the presence of refrigerant oil.

16. A refrigeration unit using a mixture of fluorinated hydrocarbons as a refrigerant,
(1) the mixture comprising difluoromethane (R32), pentafluoroethane (R125) and 1,1,1,2-tetrafluoroethane (R134a) in amounts such that the sum of the concentrations thereof is 99.5 wt % or more;
(2) the composition ratio of the fluorinated hydrocarbons contained in the mixture falling within a triangle having, as vertices, the following three points in a ternary composition diagram in which the sum of the concentrations of R32, R125, and R134a is 100 wt %,
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %); and
(3) the refrigeration unit comprising a heat exchanger in which a flow of the refrigerant and a flow of an external heat medium are counter flows.

17. A refrigeration unit using a mixture of fluorinated hydrocarbons as a refrigerant,
(1) the mixture comprising difluoromethane (R32), pentafluoroethane (R125) and 1,1,1,2-tetrafluoroethane (R134a) in amounts such that the sum of the concentrations thereof is 99.5 wt % or more;
(2) the composition ratio of the fluorinated hydrocarbons contained in the mixture falling within a triangle having, as vertices, the following three points in a ternary composition diagram in which the sum of the concentrations of R32, R125, and R134a is 100 wt %,
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %); and
(3) the refrigeration unit comprising a refrigerant circuit, which comprises a compressor, a heat-source-side heat exchanger, an expansion mechanism, and a usage-side heat exchanger in this order, and circulates the mixture as a refrigerant, and the evaporation temperature of the refrigerant when the usage-side heat exchanger functions as an evaporator being 0° C. or less.

18. A refrigeration unit using a mixture of fluorinated hydrocarbons as a refrigerant,
(1) the mixture comprising difluoromethane (R32), pentafluoroethane (R125) and 1,1,1,2-tetrafluoroethane (R134a) in amounts such that the sum of the concentrations thereof is 99.5 wt % or more, (2) the composition ratio of the fluorinated hydrocarbons contained in the mixture falling within a triangle having, as vertices, the following three points in a ternary composition diagram in which the sum of the concentrations of R32, R125, and R134a is 100 wt %, point A (R32/R125/R134a=37.3/17.0/45.7 wt %),
point F (R32/R125/R134a=30.7/10.9/58.4 wt %), and
point G (R32/R125/R134a=29.4/14.1/56.5 wt %); and (3) the refrigeration unit comprising a refrigerant circuit, which comprises a compressor, a heat-source-side heat exchanger, an expansion mechanism, and a usage-side heat exchanger in this order, and circulates the mixture as a refrigerant, the heat-source-side heat exchanger and the usage-side heat exchanger serving as heat exchangers in which a flow of the refrigerant and a flow of an external heat medium are counter flows, and the evaporation temperature of the refrigerant when the usage-side heat exchanger functions as an evaporator being 0° C. or less.

19. The refrigeration unit according to Item 17 or 18, wherein:
the expansion mechanism is a temperature-sensitive expansion valve;
the refrigerant circuit comprises a solenoid valve between the heat-source-side heat exchanger and the temperature-sensitive expansion valve; and
the heat-source-side heat exchanger functions as a radiator, and the usage-side heat exchanger functions as an evaporator.

20. The refrigeration unit according to any one of Items 17 to 19, wherein:
the refrigerant circuit comprises a four-way switching valve for switching the flow of the refrigerant compressed by the compressor between the heat-source-side heat exchanger and the usage-side heat exchanger; and
the four-way switching valve is capable of switching normal-cycle operation in which the heat-source-side heat exchanger functions as a radiator and the usage-side heat exchanger functions as an evaporator, and reverse-cycle operation in which the heat-source-side heat exchanger functions as an evaporator and the usage-side heat exchanger functions as a radiator.

21. The refrigeration unit according to any one of Items 17 to 20, wherein off-cycle defrosting in which the operation of the compressor is stopped and a usage-side fan additionally provided in the usage-side heat exchanger is operated is performed under predetermined conditions.

22. The refrigeration unit according to any one of Items 17 to 21, wherein the refrigeration unit further comprises a heating means for heating the usage-side heat exchanger, and heating defrosting in which the usage-side heat exchanger is heated by the heating means is performed under predetermined conditions.

23. The refrigeration unit according to Item 20, wherein reverse-cycle hot gas defrosting by the reverse-cycle operation is performed under predetermined conditions.

24. The refrigeration unit according to any one of Items 17 to 20, wherein:
the refrigerant circuit comprises a bypass flow path having a first end connected to a discharge end of the compressor and a second end connected to an inflow end of the usage-side heat exchanger; and
normal-cycle hot gas defrosting in which the refrigerant compressed by the compressor is introduced into the usage-side heat exchanger via the bypass flow path is performed, under predetermined conditions.

25. The refrigeration unit according to any one of Items 16 to 24, wherein the refrigeration unit is a transportation refrigeration unit.

26. The refrigeration unit according to any one of Items 16 to 24, wherein the refrigeration unit is a refrigeration unit for a showcase.

27. The refrigeration unit according to any one of Items 16 to 26, wherein the composition ratio of the fluorinated hydrocarbons contained in the mixture falls within a quadrilateral having, as vertices, the following four points in a ternary composition diagram in which the sum of the concentrations of R32, R125, and R134a is 100 wt %,
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %).

28. The refrigeration unit according to any one of Items 16 to 26, wherein the composition ratio of the fluorinated hydrocarbons contained in the mixture falls within a triangle having, as vertices, the following three points in a ternary composition diagram in which the sum of the concentrations of R32, R125, and R134a is 100 wt %,
point A' (R32/R125/R134a=35.6/16.4/48.0 wt %),
point F' (R32/R125/R134a=30.4/11.5/58.1 wt %), and
point G (R32/R125/R134a=29.4/14.1/56.5 wt %).

29. The refrigeration unit according to any one of Items 16 to 26, wherein the composition ratio of the fluorinated hydrocarbons contained in the mixture falls within a quadrilateral having, as vertices, the following four points in a ternary composition diagram in which the sum of the concentrations of R32, R125, and R134a is 100 wt %,
point B' (R32/R125/R134a=33.7/14.6/51.7 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

Advantageous Effects of Invention

The present invention uses a mixture of fluorinated hydrocarbons having a composition ratio falling within a triangle having, as vertices, the following three points:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
in a ternary composition diagram for R32, R125, and R134a indicated by the triangular coordinates of FIG. 1, as a refrigerant in a cooling system comprising heat exchangers in which a flow of the refrigerant and a flow of an external heat medium are counter flows, thereby ensuring an effect of providing an alternative refrigerant for R404A. The alternative refrigerant has a non-flammability similar to that of R404A, a refrigerating capacity that can replace that of R404A, a COP equal or superior to that of R404A, and a lower GWP than that of R404A. The mixture of fluorinated hydrocarbons may be used as an alternative refrigerant for R404A, and also as an alternative refrigerant for R22, R407A, R407C, R407E, R407F, and the like.

BRIEF DESCRIPTION OF DRAWINGS

FIG. 1: A figure showing a composition (a triangle defined by points A, F and G, a quadrilateral defined by points B, C, E and D) of a mixture of the present invention in a ternary composition diagram for R32, R125, and R134a.

FIG. 2: A figure showing a composition (a triangle defined by points A', F' and G, a quadrilateral defined by points B', C, E and D') of a mixture of the present invention in a ternary composition diagram for R32, R125, and R134a.

FIG. 4: A figure showing the relationship between P: ASHRAE non-flammable border line and P': ASHRAE non-flammable border line in which allowable ranges are taken into consideration, in a ternary composition diagram for R32, R125, and R134a.

DESCRIPTION OF EMBODIMENTS

With reference to drawings, a refrigeration unit according to an embodiment of the present invention, and a cooling system constituting the refrigeration unit are described below.

Refrigeration Unit of First Embodiment and Cooling System Constituting the Refrigeration Unit A refrigeration unit according to a first embodiment and a cooling system for constituting the refrigeration unit comprise a countercurrent-flow type heat exchanger in which the flow of a refrigerant and the flow of an external heat medium are opposed to each other. The "countercurrent flow" means that, in a heat exchanger, the direction of the flow of the refrigerant is opposite to the direction of the flow of an external heat medium; more specifically, the refrigerant is flowed from the downstream side toward the upstream side of the flow of the external heat medium. This flow is different from the parallel flow in which the refrigerant is flowed in the normal direction with respect to the flow of the external heat medium (the refrigerant is flowed from the upstream side to the downstream side of the flow of the external heat medium).

Figure 6:
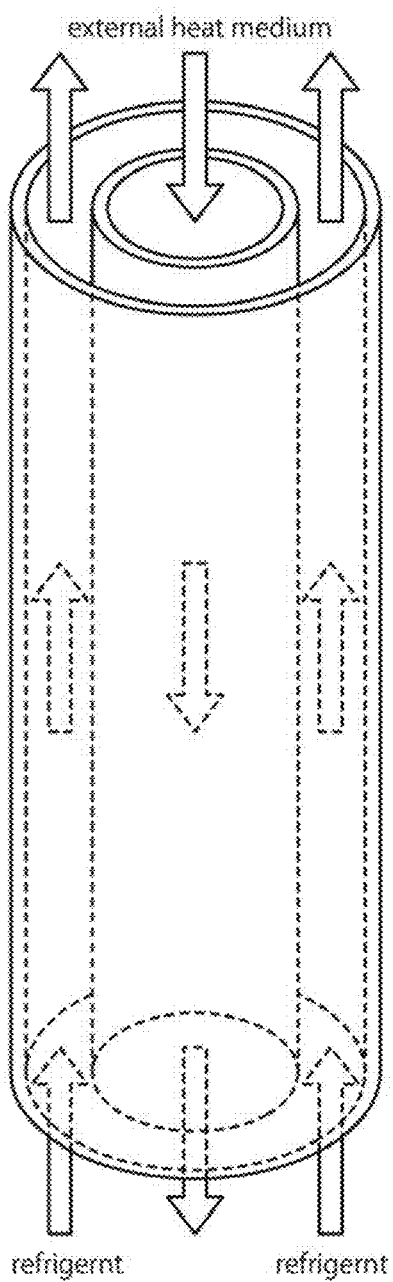
FIG. 6: A schematic view showing an example of a countercurrent-type heat exchanger.
Figure 6:
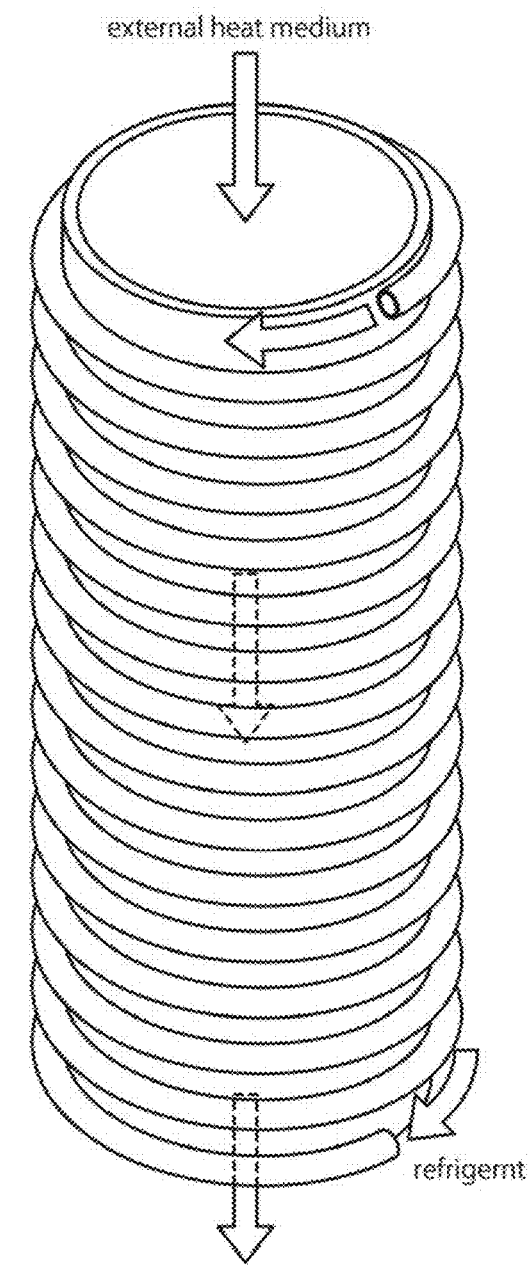

More specifically, when the external heat medium is water, a double-pipe heat exchanger, such as the one shown in FIG. 6(a), is used, in which, for example, the external heat medium is flowed from a first end to a second end (in the figure, from the upper end to the lower end) in an inner pipe P1, and the refrigerant is flowed from the second end to the first end (in the figure, from the lower end to the upper end) in an outer pipe P2, so that the refrigerant and the external heat medium are flowed as counter flows. Further, by providing a heat exchanger in which a helix tube P4 is wound around the circumference surface of a cylindrical tube P3, such as the one shown in FIG. 6(b), in which, for example, the external heat medium is flowed from a first end to a second end (in the figure, from the upper end to the lower end) in the cylindrical tube P3, and the refrigerant is flowed from the second end to the first end (in the figure, from the lower end to the upper end) in the helix tube P4, so that the refrigerant and the external heat medium are flowed as counter flows. Further, although it is not shown in the figures, any known heat exchanger in which the flow of the refrigerant is opposed to the flow of the external heat medium, such as a plate type heat exchanger, may also be used.

Figure 7:
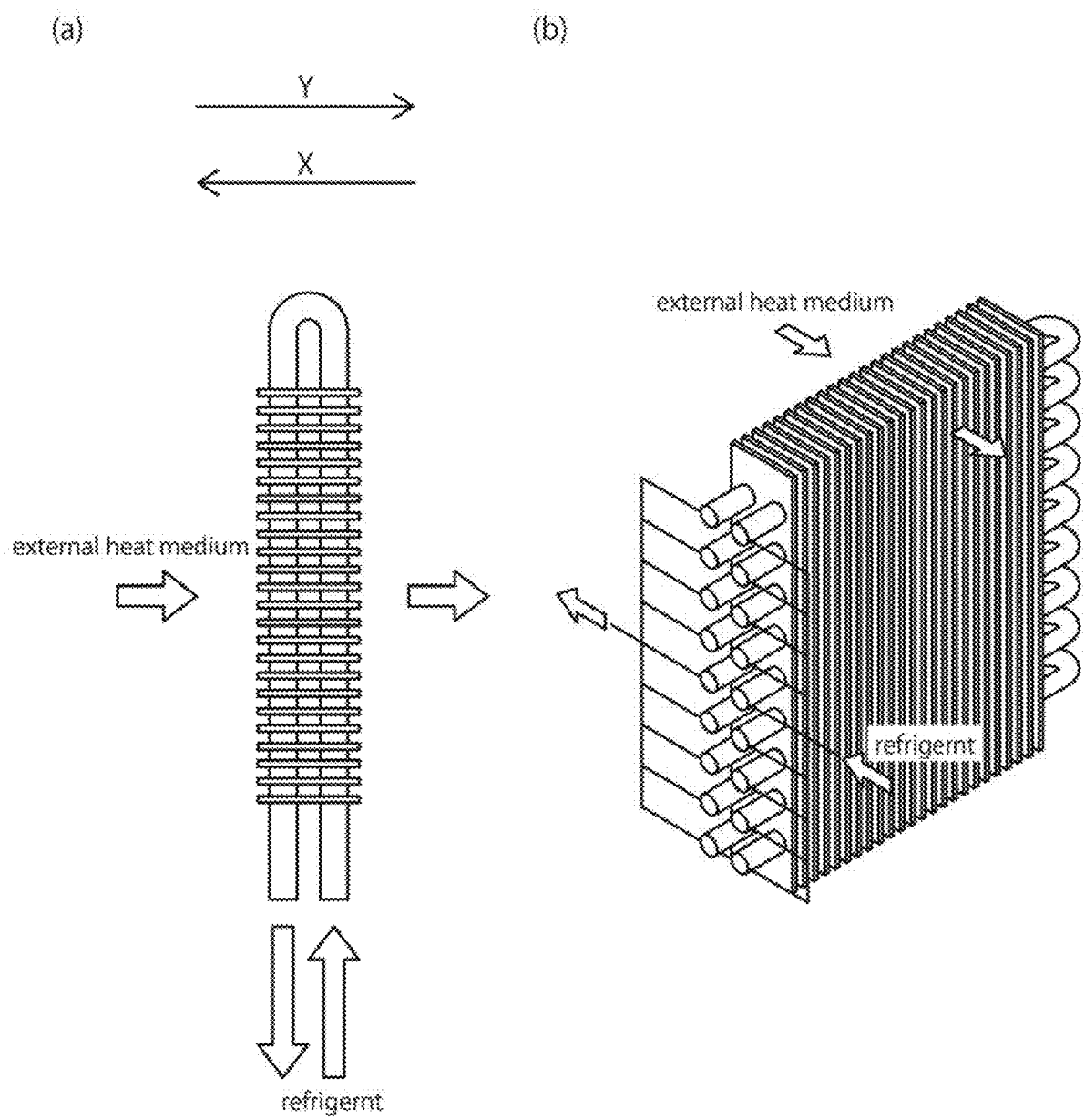
FIG. 7: A schematic view showing an example of a countercurrent-type heat exchanger. (a) is a plan view and (b) is a perspective view.

Further, when the external heat medium is air, a finned tube-type heat exchanger, such as the one shown in FIG. 7, may be used. A finned tube-type heat exchanger has a plurality of fins F provided in parallel at predetermined intervals and a heat-transfer tube P5 that runs in a serpentine manner in a plan view. A plurality of (two in FIG. 7) linear portions provided in parallel to constitute the heat-transfer tube P5 penetrate through the plurality of fins F. One of the two ends of the heat-transfer tube P5 serves as the inflow port for the refrigerant, while the other serves as the outflow port for the refrigerant. By flowing the refrigerant from the downstream side to the upstream side in an air distribution direction Y, as shown by the arrow X, the refrigerant and the external heat medium are flowed as counter flows.

The mixture of fluorinated hydrocarbons used as a refrigerant in the refrigeration unit according to the present invention and the cooling system constituting the refrigeration unit is a zeotropic composition containing R32, R125 and R134a, and the temperature of the heating medium increases or decreases during evaporation and condensation under an isobaric condition.

As described above, a refrigeration cycle in which temperature change (temperature glide) occurs upon evaporation and condensation is called a Lorentz cycle. Although in the Lorentz cycle the difference in the temperature of the refrigerants during evaporation and condensation is reduced since each of the evaporator and condenser serving as heat exchangers is a countercurrent-type heat exchanger, a temperature difference large enough to efficiently transfer heat between the refrigerant and the external heat medium is maintained, thereby enabling efficient heat exchange. Further, another advantage of a cooling system having countercurrent-type heat exchangers is the minimum pressure difference. As described above, a cooling system having countercurrent-type heat exchangers is capable of improving energy efficiency and/or capacity, compared with known systems.

A Refrigeration Unit of the Second Embodiment and a Cooling System Constituting the Refrigeration Unit In the refrigeration unit according to the second embodiment and the cooling system constituting the refrigeration unit, the refrigerant evaporation temperature when the usage-side heat exchanger functions as an evaporator is 0° C. or less. The refrigerant evaporation temperature can be measured by detecting the refrigerant temperature at the outlet of the usage-side heat exchanger. In the refrigeration unit according to the second embodiment and the cooling system constituting the refrigeration unit, it is not always necessary to use a countercurrent-type heat exchanger as the heat exchanger.

A Refrigeration Unit of the Third Embodiment and a Cooling System Constituting the Refrigeration Unit The refrigeration unit according to the third embodiment and the cooling system constituting the refrigeration unit comprise a countercurrent-type heat exchanger in which the refrigerant and the external heat medium are counter flows, and the evaporation temperature of the refrigerant when the heat exchanger functions as an evaporator is 0° C. or less. A Mixture of Fluorinated Hydrocarbons, and a Composition Containing the Mixture The mixture (which hereinafter may also be referred to as "the mixture of the present invention") used as a refrigerant for the refrigeration unit according to the present invention and the cooling system constituting the refrigeration unit is a mixture of fluorinated hydrocarbons.

(1) The mixture comprises difluoromethane (R32), pentafluoroethane (R125) and 1,1,1,2-tetrafluoroethane (R134a) in amounts such that the sum of the concentrations thereof is 99.5 wt % or more.

(2) The composition ratio of the fluorinated hydrocarbons contained in the mixture falls within a triangle having, as vertices, the following three points in a ternary composition diagram in which the sum of the concentrations of R32, R125, and R134a is 100 wt % (FIG. 1),
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %).

The composition of the present invention has, for example, a non-flammability similar to that of R404A, a refrigerating capacity that can replace that of R404A, a COP equal or superior to that of R404A, and a lower GWP than that of R404A. In particular, by being used as a refrigerant in a cooling system having a countercurrent-type heat exchanger, the mixture of the present invention more easily ensures superior COP.

More specifically, since the mixture of the present invention is non-flammable according to ASHRAE (details of the definition, etc., are described later) like R404A, the mixture of the present invention is safer than flammable refrigerants and can be used in a wide range of applications.

The refrigerating capacity of the composition of the present invention can replace that of R404A. More specifically, the refrigerating capacity of the mixture of the present invention is preferably 94% or more, more preferably 97.5% or more, and even more preferably 100% or more, relative to that of R404A.

The COP of the mixture of the present invention when used as a refrigerant in a cooling system having a countercurrent-type heat exchanger is equal or superior to that of R404A (100% or more). The COP of the composition of the present invention is more preferably 105 or more, and even more preferably 110 or more, relative to that of R404A.

Furthermore, in teams of inhibiting deterioration of the unit or the refrigerant oil, the compressor outlet temperature in the refrigeration cycle is such that the discharge temperature is preferably 140° C. or less, more preferably 137.5° C. or less, and further preferably 135° C. or less.

Moreover, the mixture of the present invention has a GWP of 1500 or less, and thus can notably reduce a burden on the environment from a global warming perspective compared with other general-purpose refrigerants.

R404A is a refrigerant currently widely used for freezing and refrigerated storage, and the composition of the present invention can be an alternative refrigerant for R404A.

In the mixture of the present invention, the mixture described above may consist only of three basic components, i.e., difluoromethane (R32), pentafluoroethane (R125), and 1,1,1,2-tetrafluoroethane (R134a), or may comprise one or more components that are different from the three basic components (referred to as "other components") in addition to the three basic components. Hereinafter, difluoromethane (R32), pentafluoroethane (R125), and 1,1,1,2-tetrafluoroethane (R134a) are referred to as "three basic components" and one or more components that are different from the three basic components are referred to as "other components." Other components are described in detail later. When the mixture of the present invention is used in the refrigeration unit according to the present invention and the cooling system constituting the refrigeration unit, it is possible to use only the mixture as the working fluid (refrigerant), or a working fluid (composition) obtained by adding arbitrary additives, such as refrigerant oil, to the mixture may be used as a working fluid including a refrigerant. Arbitrary additives and the like are described later.

When the mixture contains other components, the mixture preferably contains other components in amounts such that the functions of the three basic components are not impaired. From this viewpoint, the content of other components in the mixture is preferably 0.5 wt % or less, more preferably 0.3 wt % or less, and even more preferably 0.1 wt % or less.

The mixture of the present invention (Embodiment 1) comprises:
(1) difluoromethane (R32), pentafluoroethane (R125) and 1,1,1,2-tetrafluoroethane (R134a) in amounts such that the sum of the concentrations thereof is 99.5 wt % or more, wherein:
(2) the composition ratio of the fluorinated hydrocarbons contained in the mixture falls within a triangle having, as vertices, the following three points in a ternary composition diagram in which the sum of the concentrations of R32, R125, and R134a is 100 wt % (FIG. 1):
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %).

As is described later in detail, in FIG. 1, a straight line passing through two points, i.e., point A and point F, denotes an ASHRAE non-flammable border line; a straight line passing through two points, i.e., point A and point G, denotes a line indicating a composition ratio at which the GWP is 1500; and a straight line passing through two points, i.e., point F and point G, denotes a line indicating a composition ratio at which the refrigerating capacity is 94% relative to that of R404A.

In view of improving the refrigerating capacity, a preferred embodiment is, for example, the following Embodiment 2, Embodiment 3, or Embodiment 4, in which the range of the triangle of Embodiment 1 is further restricted.

In Embodiment 2, the composition ratio of the fluorinated hydrocarbons contained in the mixture falls within a quadrilateral having, as vertices, the following four points in a ternary composition diagram (FIG. 1) in which the sum of the concentrations of R32, R125, and R134a is 100 wt %:
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %).

In Embodiment 2, a straight line passing through two points, i.e., point E and point D, denotes a line indicating a composition ratio in which the refrigerating capacity is 97.5% relative to that of R404A, and a straight line passing through two points, i.e., point B and point C, denotes a line indicating a composition ratio in which the refrigerating capacity is 100% relative to that of R404A. From the viewpoint of the refrigerating capacity, the mixture in which the composition ratio falls within a triangle having, as vertices, the three points A, B and C is preferable; however, in the mixture in which the composition ratio falls within this range, the compressor outlet temperature may exceed 137.5° C. Thus, from the viewpoint of both the refrigerating capacity and the compressor outlet temperature, it is more preferable to use a mixture in which the composition ratio falls within a quadrilateral having, as vertices, the four points B, C, E and D, as a refrigerant in a cooling system having a countercurrent-type heat exchanger.

In Embodiment 3, the composition ratio of the fluorinated hydrocarbons contained in the mixture falls within a triangle having, as vertices, the following three points in a ternary composition diagram in which the sum of the concentrations of R32, R125, and R134a is 100 wt % (FIG. 2),
point A' (R32/R125/R134a=35.6/16.4/48.0 wt %),
point F' (R32/R125/R134a=30.4/11.5/58.1 wt %), and
point G (R32/R125/R134a=29.4/14.1/56.5 wt %).

As is described later in detail, in FIG. 2, a straight line passing through two points, i.e., point A' and point F', indicates an ASHRAE non-flammable border line when the allowable range is set to ±0.5% in the production of R32, R125, and R134a; a straight line passing through two points, i.e., point A' and point G, denotes a line indicating a composition ratio at which the GWP is 1500; and a straight line passing through two points, i.e., point F' and point G, denotes a line indicating a composition ratio at which the refrigerating capacity is 94% relative to that of R404A.

In view of improvement in the refrigerating capacity and the compressor outlet temperature, a preferred embodiment is, for example, the following Embodiment 4, in which the range of the quadrilateral of Embodiment 3 is further restricted.

In Embodiment 4, the composition ratio of the fluorinated hydrocarbons contained in the mixture falls within a quadrilateral having, as vertices, the following four points in a ternary composition diagram in which the sum of the concentrations of R32, R125, and R134a is 100 wt % (FIG. 2),
point B' (R32/R125/R134a=33.7/14.6/51.7 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

As is described later in detail, in FIG. 2, a straight line passing through two points, i.e., points B' and point F', indicates an ASHRAE non-flammable border line when the allowable range is set to ±0.5% in the production of R32 and R125 and the allowable range is set to ±1.0% in the production of R134a; a straight line passing through two points, i.e., point C and point E, denotes a line indicating a composition ratio at which the GWP is 1500; a straight line passing through two points, i.e., point E and point D', denotes a line indicating a composition ratio at which the refrigerating capacity is 97.5% relative to that of R404A; and a straight line passing through two points, i.e., point B' and point C, denotes a line indicating a composition ratio at which the refrigerating capacity is 100% relative to that of R404A. From the viewpoint of the refrigerating capacity, the mixture in which the composition ratio falls within a triangle having, as vertices, the three points A', B', and C is preferable; however, in the mixture in which the composition ratio falls within this range, the compressor outlet temperature may exceed 137.5° C. Thus, from the viewpoint of both the refrigerating capacity and the compressor outlet temperature, it is more preferable to use a mixture in which the composition ratio falls within a quadrilateral having, as vertices, the four points B', C, E, and D', as a refrigerant in a cooling system having a countercurrent-type heat exchanger. Further, such a mixture is also more preferable as a refrigerant mixture that is an alternative to R404A.

Figure 1:
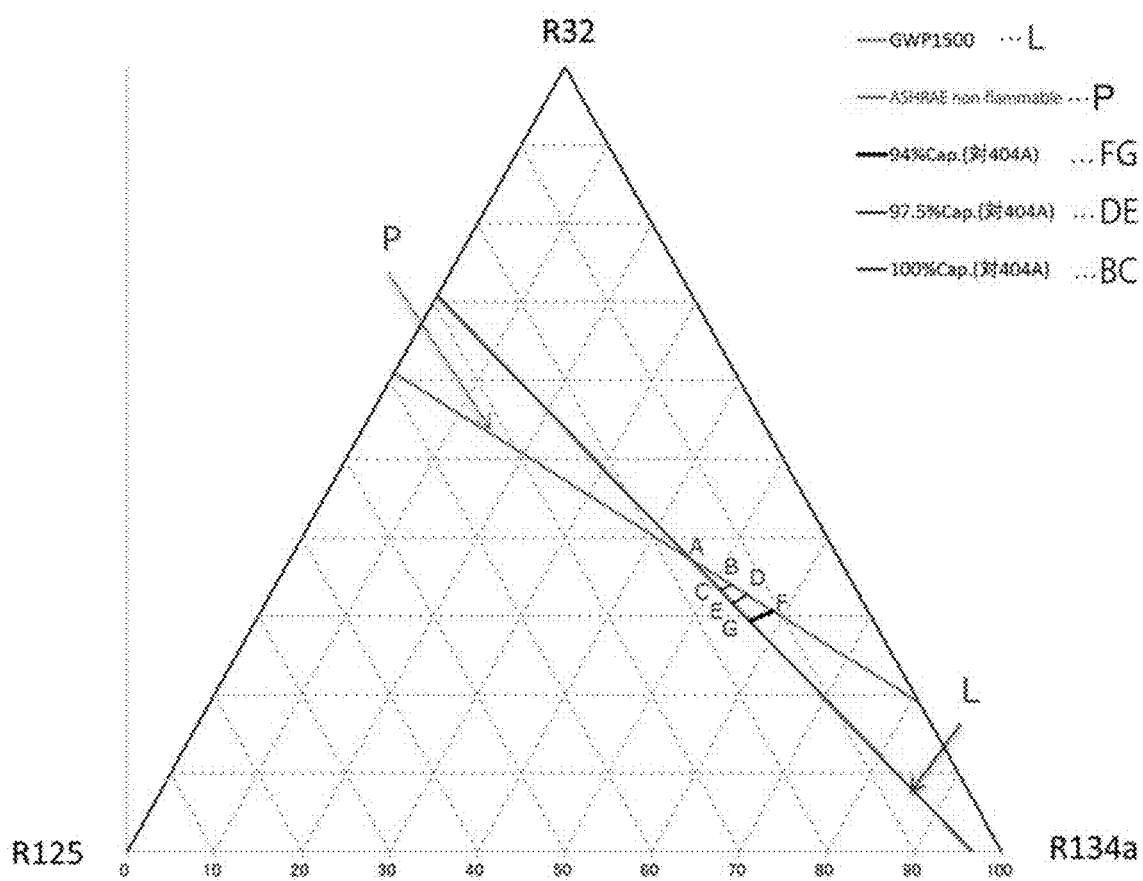

The technical meaning of each point in FIG. 1 is described in detail below.

In FIG. 1, when the wt % of R32=x, the wt % of R125=y, and the wt % of R134a=z, a line segment indicating an ASHRAE non-flammable border line is approximated by a line segment represented by the following equations.

ASHRAE non-flammable border line: a straight line passing through two points, i.e., point A and point F (line segment P of FIG. 1)

$$y=0.9286x-17.643$$

$$z=100-x-y$$

$$19 \leq x \leq 61$$

The ASHRAE flammability classification of refrigerants is described below.

The ASHRAE flammability classification of refrigerants is performed based on ANSI/ASHRAE Standard 34-2013. Refrigerants classified as Class 1 are non-flammable refrigerants. That is, the mixture of the present invention being non-flammable according to ASHRAE means that the mixture containing fluorinated hydrocarbons used in the present invention (in particular, the three basic components) is classified as Class 1 in flammability classification.

More specifically, a leak test during storage, transportation, and use is performed based on ANSI/ASHRAE 34-2013 to specify the worst case of fractionation for flammability (WCFF). When the WCFF composition can be identified as being non-flammable in a test based on ASTM E681-09 (a standard test method for concentration limits of flammability of chemicals (vapors and gases)), it is classified as Class 1.

In FIG. 1, the R125 side from the line segment AF is classified as a mixed refrigerant that is non-flammable according to ASHRAE, whereas the R32 side from the line segment AF is classified as a mixed refrigerant that is flammable according to ASHRAE (Class 2: slightly flammable mixed refrigerants, Class 3: flammable mixed refrigerants).

However, in the production of a mixed refrigerant, an allowable range (allowable error) is set for each refrigerant. Thus, even if the center composition of the mixed refrigerant is on the R125 side from the line segment AF of FIG. 1, when the allowable ranges are not all on the R125 side from the line segment AF, the mixed refrigerant is not defined as a mixed refrigerant that is non-flammable according to ASHRAE.

Figure 3:
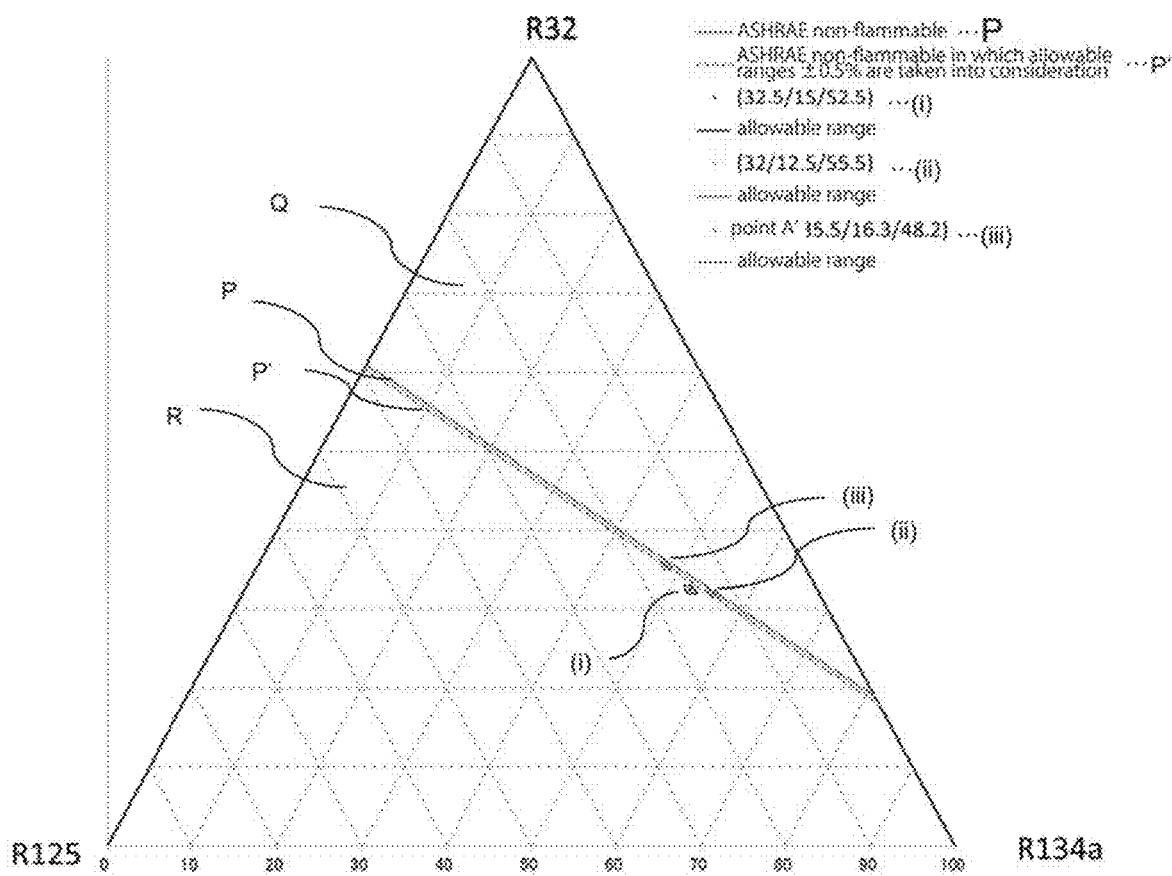
FIG. 3: A figure showing a ternary composition diagram for R32, R125, and R134a in which P: ASHRAE non-flammable border line, P': ASHRAE non-flammable border line in which allowable ranges are taken into consideration, Q: ASHRAE flammable region, and R: ASHRAE non-flammable region are shown. The diagram also shows the relationship between the allowable range (allowable error) set for each refrigerant in the production of a mixed refrigerant and criteria for determining whether the mixed refrigerant is classified as a mixed refrigerant that is non-flammable according to ASHRAE or a mixed refrigerant that is flammable according to ASHRAE.

For example, in the case where R32=32.5 wt %±0.5 wt %, R125=15.0 wt %±0.5 wt %, and R134a=52.5 wt %±1.0 wt %, all of the allowable ranges are on the R125 side from the line segment AF as shown in FIG. 3, and thus, the case is classified as a mixed refrigerant that is non-flammable according to ASHRAE. On the other hand, in the case where R32=32.0 wt %±0.5 wt %, R125=12.5 wt %±0.5 wt %, and R134a=55.5 wt %±1 wt %, the allowable ranges are partially on the R32 side from the line segment AF, and thus, a mixed refrigerant in which these allowable ranges are set is classified as a mixed refrigerant that is flammable according to ASHRAE.

Figure 4:
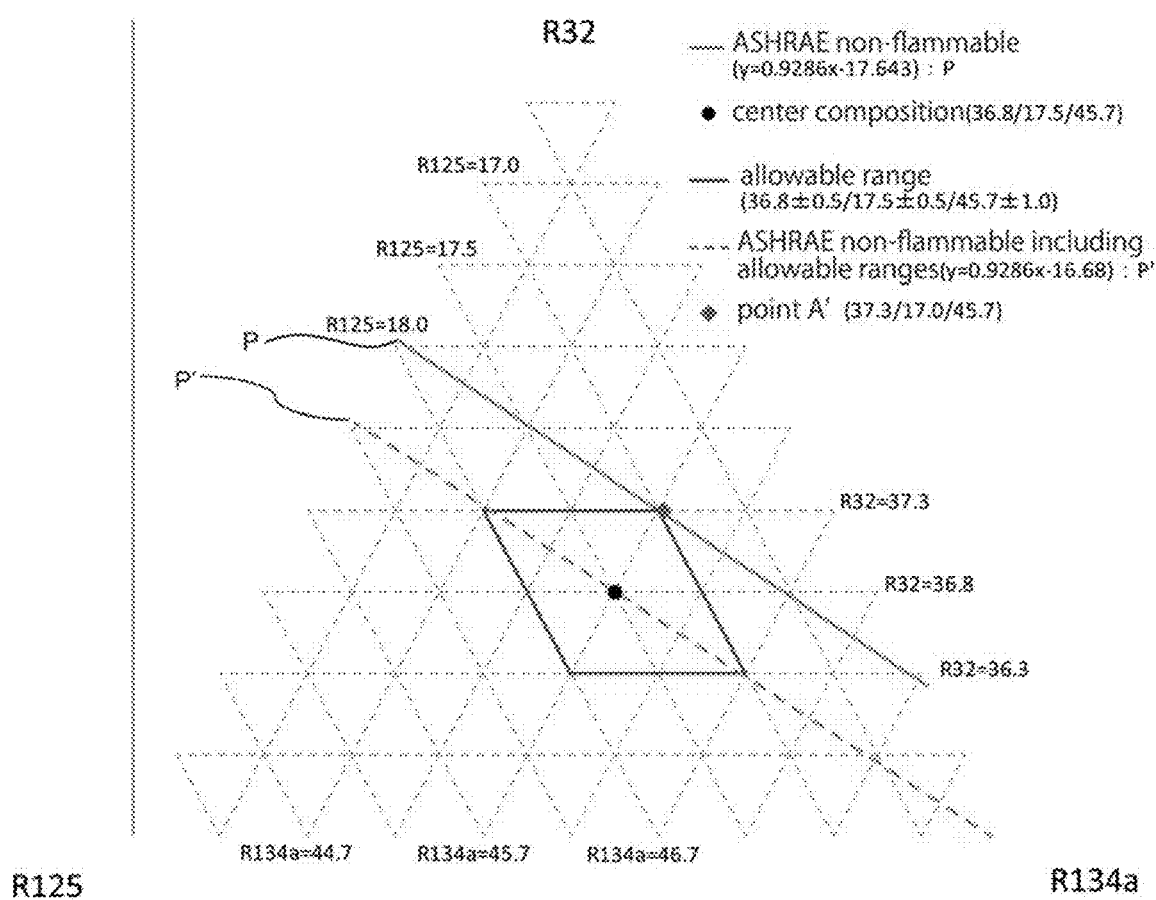
Figure 5:
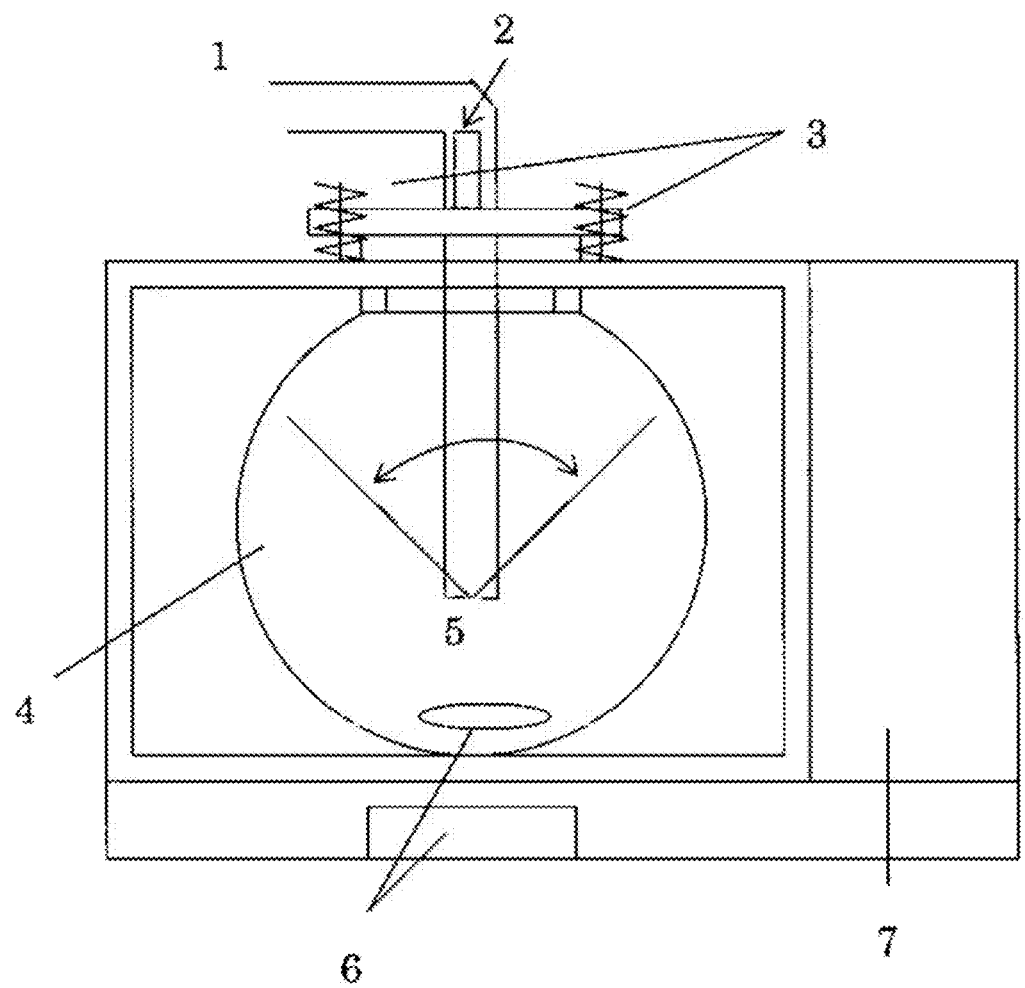
FIG. 5: A schematic view showing a unit used in a flammability test.

When the allowable range of R32 is set to ±0.5 wt %, the allowable range of R125 is set to ±0.5 wt %, and the allowable range of R134a is set to ±1.0 wt %, the range in which all of the allowable ranges are on the AF line segment side is regarded as ASHRAE non-flammable border line in which the allowable ranges are taken into consideration. FIG. 4 shows the details. In FIG. 4, point A (37.3/17.0/45.7) denotes the most flammable point WCF (Worst case of fractionation) within the allowable range, and the center composition when the allowable range of R32 is ±0.5 wt %, the allowable range of R125 is ±0.5 wt %, and the allowable range of R134a is ±1.0 wt % is (36.8/17.5/45.7). The formula having the same inclination as that of ASHRAE non-flammable formula, i.e., 0.9286, which passes through the center composition corresponds to the ASHRAE non-flammable border line in which the allowable ranges are taken into consideration, and is approximated by the following equations.

Figure 2:
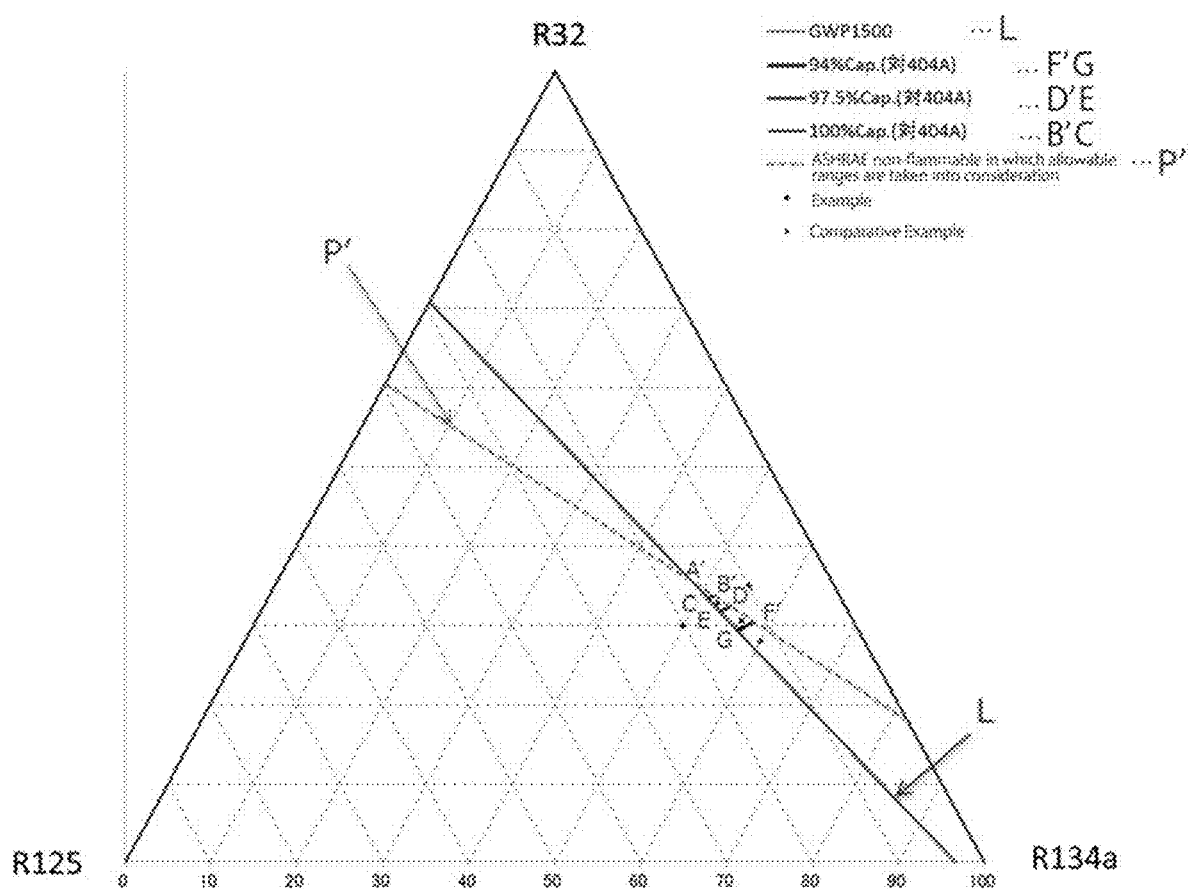

ASHRAE non-flammable border line in which the allowable ranges are taken into consideration: a straight line passing through two points, i.e., point A' and point F' (line segment P' of FIGS. 1, 2, and 3)

$y=0.9286x-16.68$ $z=100-x-y$ $18.0 \leq x \leq 60.5$

In FIG. 1, when the wt % of R32=x, the wt % of R125=y, and the wt % of R134a=z, a line segment indicating a composition ratio at which GWP=1500 is approximated by a line segment represented by the following equations.

Line segment indicating a composition ratio at which GWP=1500: a straight line passing through two points, i.e., point A and point G (line segment L of FIG. 1)

$y=0.3644x+3.400$ $z=100-x-y$ $0 \leq x \leq 70.8$

In addition, line segments indicating composition ratios at which the refrigerating capacity is 94%, 97.5%, and 100% relative to that of R404A are approximated by line segments represented by the following equations. Points of intersection with the ASHRAE non-flammable border line in which the allowable ranges are taken into consideration (y=0.9286x−16.68) are also described below.

Line segment indicating a composition ratio at which the refrigerating capacity is 94% relative to that of R404A: a straight line passing through two points, i.e., point G and point F (line segment X of FIG. 1)

$y=-2.4615x+86.469$

Point of intersection F' with the ASHRAE non-flammable border line in which the allowable ranges are taken into consideration=(30.4/11.5/58.1) (point F' of FIG. 2)

Line segment indicating a composition ratio at which the refrigerating capacity is 97.5% relative to that of R404A: a straight line passing through two points, i.e., point D and point E (line segment Y of FIG. 1)

$y=-2.1x+81.47$

Point of intersection D' with the ASHRAE non-flammable border line in which the allowable ranges are taken into consideration=(32.4/13.4/54.2) (point D' of FIG. 2)

Line segment indicating a composition ratio at which the refrigerating capacity is 100% relative to that of R404A: a straight line passing through two points, i.e., point B and point C (line segment Z of FIG. 1)

$y=-2.2857x+91.614$

Point of intersection B' with the ASHRAE non-flammable border line in which the allowable ranges are taken into consideration=(33.7/14.6/51.7) (point B' of FIG. 2)

The point of intersection A' of the ASHRAE non-flammable border line in which the allowable ranges are taken into consideration (y=0.9286x−16.68) and the line segment indicating a composition ratio at which the GWP is 1500 (y=0.3644x+3.400) is represented as (35.6/16.4/48.0) (A' of FIG. 2).

Components Other Than the Three Basic Components

The mixture of the present invention may further contain a tiny amount of water in addition to the three basic components (R32, R125, and R134a). The amount of water is preferably 0.1 parts by weight or less, per 100 parts by weight of the mixture. When the mixture contains a tiny amount of water, the double bonds in the molecules of unsaturated fluorinated hydrocarbons that may be contained in the mixture can be stably present, and oxidation of unsaturated fluorinated hydrocarbons is less likely to occur, resulting in improved stability of the mixture.

The mixture of the present invention may contain other component(s) (fluorinated hydrocarbon(s) that are different from the three basic components) in addition to the three basic components (R32, R125, and R134a). The fluorinated hydrocarbon(s) as other component(s) are not particularly limited, and, are, for example, at least one fluorinated hydrocarbon selected from the group consisting of HCFC-1122, HCFC-124, CFC-1113, and 3,3,3-trifluoropropyne.

The mixture of the present invention may contain, in addition to the three basic components (R32, R125, and R134a), at least one halogenated organic compound represented by formula (1): $C_mH_nX_p$, wherein each X independently represents a fluorine atom, a chlorine atom, or a bromine atom, m is 1 or 2, $2m+2 \geq n+p$, and $p \geq 1$, as other component(s). The at least one halogenated organic compound as other component(s) is not particularly limited. Preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, trifluoroethylene, and the like.

The mixture of the present invention may contain, in addition to the three basic components (R32, R125, and R134a), at least one organic compound represented by formula (2): $C_mH_nX_p$, wherein each X independently represents an atom that is not a halogen atom, m is 1 or 2, $2m+2 \geq n+p$, and $p \geq 1$, as other component(s). The at least one organic compound as other component(s) is not particularly limited. Preferable examples include propane, isobutane, and the like.

As described above, when the mixture contains other components, the content of other components in the mixture, whether other components are used singly or in a combination of two or more, is preferably 0.5 wt % or less, more preferably 0.3 wt % or less, and even more preferably 0.1 wt % or less, as the total content amount.

Optional Additives

The mixture of the present invention is used as a composition by being appropriately combined with various additives.

The composition of the present invention may contain a refrigerant oil. The refrigerant oil is not particularly limited and can be suitably selected from commonly used refrigerant oils. In this case, a refrigerant oil that is more excellent in terms of, for example, the effect of improving miscibility with the mixture, stability of the mixture, etc., may be appropriately selected as required.

Although there is no particular limitation, the stability of the mixture can be evaluated by a commonly used method. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

Preferred as the type of the refrigerant oil is, specifically, for example, at least one member selected from the group consisting of polyalkylene glycol (PAG), polyol ester (POE), and polyvinyl ether (PVE).

The refrigerant oil to be used may have, for example, a kinematic viscosity at 40° C. of 5 to 400 cSt. When the refrigerant oil has a kinematic viscosity within this range, it is preferable in terms of lubricity.

The concentration of the refrigerant oil is not particularly limited, and may be generally 10 to 50 wt %, relative to the entire composition.

The composition of the present invention may contain one or more tracers. The one or more tracers are incorporated in the composition at a detectable concentration so that, when the composition of the present invention is diluted, contaminated, or undergoes any other change, the change can be traced. There is no limitation on the tracers. Preferable examples include hydrofluorocarbons, deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. Particularly preferred are hydrofluorocarbons or fluoroethers.

The composition of the present invention may contain a compatibilizer. The type of compatibilizer is not particularly limited. Preferable examples include polyoxyalkylene glycol ethers, amides, nitriles, ketones, chlorocarbons, esters, lactones, aryl ethers, fluoroethers, 1,1,1-trifluoroalkans, and the like. Particularly preferred are polyoxyalkylene glycol ethers.

The composition of the present invention may contain one or more ultraviolet fluorescent dyes. There is no limitation on the ultraviolet fluorescent dyes. Preferable examples include naphthalimide, coumarin, anthracene, phenanthrene, xanthene, thioxanthene, naphthoxanthene, and fluorescein, and derivatives thereof. Either naphthalimide or coumarin, or both are particularly preferable.

The composition of the present invention may contain a stabilizer, a polymerization inhibitor, etc., if necessary.

Examples of stabilizers include, but are not particularly limited to, (i) aliphatic nitro compounds, such as nitromethane and nitroethane; and aromatic nitro compounds, such as nitrobenzene and nitrostyrene; (ii) ethers, such as 1,4-dioxane; amines, such as 2,2,3,3,3-pentafluoropropylamine and diphenylamine; butylhydroxyxylene, benzotriazole, and the like. The stabilizers can be used singly or in a combination of two or more.

The concentration of the stabilizer varies depending on the type of stabilizer, but can be determined within a range in which the properties of the composition are not impaired. The concentration of the stabilizer is generally preferably about 0.01 to 5 parts by weight, and more preferably about 0.05 to 2 parts by weight, per 100 parts by weight of the mixture.

Examples of polymerization inhibitors include, but are not particularly limited to, 4-methoxy-1-naphthol, hydroquinone, hydroquinonemethyl ether, dimethyl-t-butylphenol, 2,6-di-tert-butyl-p-cresol, benzotriazole, and the like.

The concentration of the polymerization inhibitor is generally preferably 0.01 to 5 parts by weight, and more preferably about 0.05 to 2 parts by weight, per 100 parts by weight of the mixture.

In an example of an embodiment of the present invention, an object can be refrigerated by a method comprising the step of operating a refrigeration cycle using the mixture (or composition) of the present invention. For example, the mixture (or composition) of the present invention can be circulated via a compressor to form the refrigeration cycle.

It is also possible to produce a unit for forming a refrigeration cycle in which the mixture (or composition) of the present invention is circulated via a compressor.

Examples of refrigerating devices that can use the mixture (or composition) of the present invention include, but are not limited to, refrigerators, freezers, water coolers, ice machines, refrigerating showcases, freezing showcases, freezing and refrigerating units, refrigerating devices used, for example, for freezing and refrigerating warehouses, chillers (chilling units), turbo refrigerators, screw refrigerators, and the like.

Method for Producing Composition

The method for producing the mixture of Embodiment 1 of the present invention comprises the step of mixing R32, R125, and R134a such that:

(1) the mixture comprises difluoromethane (R32), pentafluoroethane (R125), and 1,1,1,2-tetrafluoroethane (R134a) in amounts such that the sum of the concentrations thereof is 99.5 wt % or more; and (2) the composition ratio of the fluorinated hydrocarbons contained in the mixture is adjusted to fall within a triangle having the following three points as vertices in a ternary composition diagram (FIG. 1) in which the sum of the concentrations of R32, R125, and R134a is 100 wt %:

point A (R32/R125/R134a=37.3/17.0/45.7 wt %), point F (R32/R125/R134a=30.7/10.9/58.4 wt %), and point G (R32/R125/R134a=29.4/14.1/56.5 wt %).

The composition of Embodiment 1 can be produced by this production method.

The method for producing the composition of Embodiment 2 of the present invention comprises the step of mixing R32, R125, and R134a such that:
(1) the mixture comprises difluoromethane (R32), pentafluoroethane (R125), and 1,1,1,2-tetrafluoroethane (R134a) in amounts such that the sum of the concentrations thereof is 99.5 wt % or more; and
(2) the composition ratio of the fluorinated hydrocarbons contained in the mixture is adjusted to fall within a quadrilateral having the following four points as vertices in a ternary composition diagram (FIG. 1) in which the sum of the concentrations of R32, R125, and R134a is 100 wt %:
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %), The composition of Embodiment 2 can be produced by this production method.

The method for producing the composition of Embodiment 3 of the present invention comprises the step of mixing R32, R125, and R134a such that:
(1) the mixture comprises difluoromethane (R32), pentafluoroethane (R125), and 1,1,1,2-tetrafluoroethane (R134a) in amounts such that the sum of the concentrations thereof is 99.5 wt % or more; and
(2) the composition ratio of the fluorinated hydrocarbons contained in the mixture is adjusted to fall within a triangle having the following three points as vertices in a ternary composition diagram (FIG. 2) in which the sum of the concentrations of R32, R125, and R134a is 100 wt %:
point A' (R32/R125/R134a=35.6/16.4/48.0 wt %),
point F' (R32/R125/R134a=30.4/11.5/58.1 wt %), and
point G (R32/R125/R134a=29.4/14.1/56.5 wt %).

The composition of Embodiment 3 can be produced by this production method.

The method for producing the composition of Embodiment 4 of the present invention comprises the step of mixing R32, R125, and R134a such that:
(1) the mixture comprises difluoromethane (R32), pentafluoroethane (R125), and 1,1,1,2-tetrafluoroethane (R134a) in amounts such that the sum of the concentrations thereof is 99.5 wt % or more; and
(2) the composition ratio of the fluorinated hydrocarbons contained in the mixture is adjusted to fall within a quadrilateral having the following four points as vertices in a ternary composition diagram (FIG. 1) in which the sum of the concentrations of R32, R125, and R134a is 100 wt %:
point B' (R32/R125/R134a=33.7/14.6/51.7 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

The composition of Embodiment 4 can be produced by this production method.

Schematic Structure of Refrigeration Unit (Cooling System)

Figure 8:
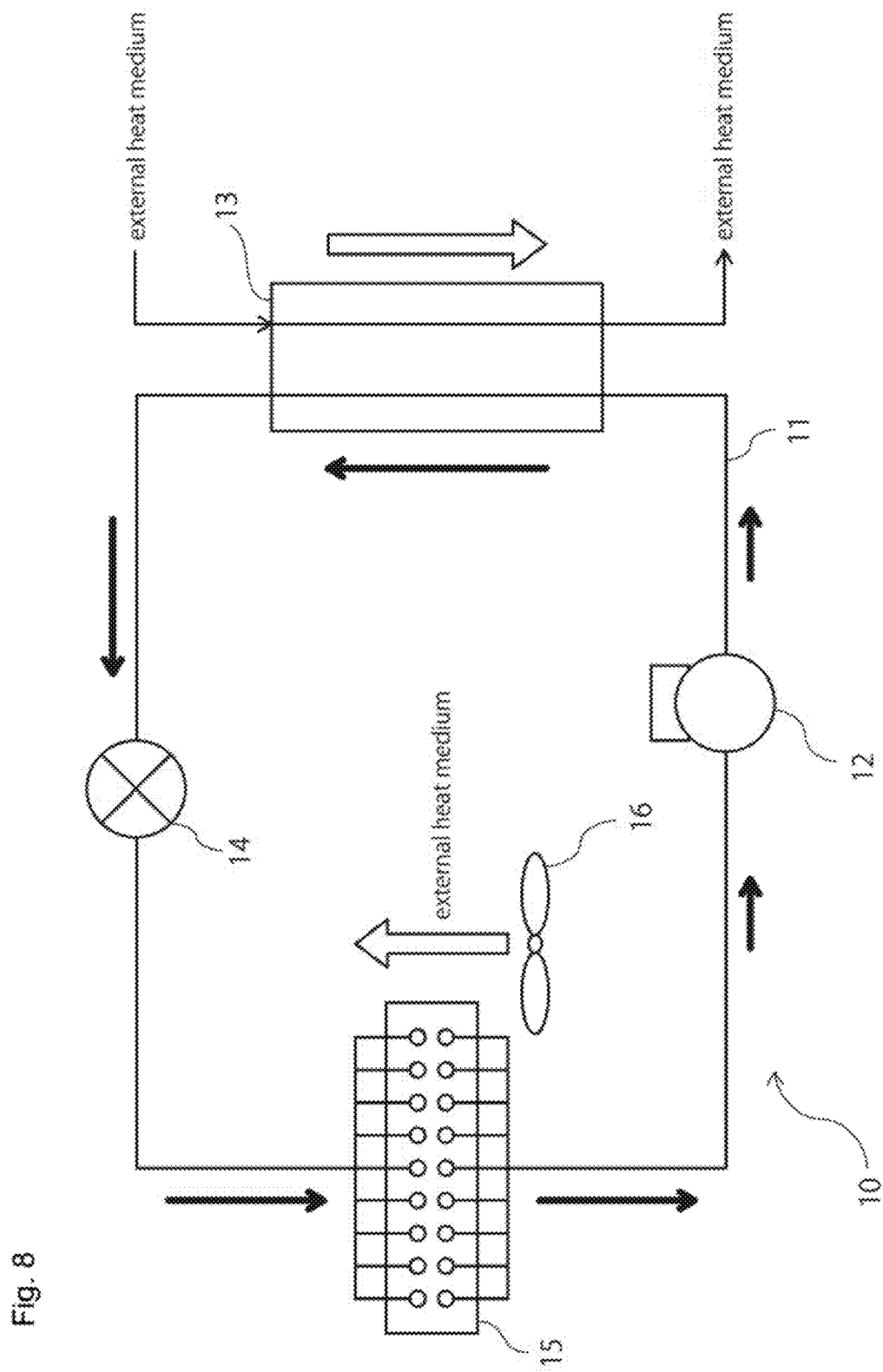
FIG. 8: A schematic view showing an embodiment of a refrigerant circuit in a refrigeration unit (a cooling system constituting the refrigeration unit) of the present invention.

FIG. 8 shows an embodiment of a refrigerant circulation route in a refrigeration unit (cooling system) 10. The refrigeration unit (cooling system) 10 has a refrigerant circuit 11 in which the refrigerant circulates. The refrigerant circuit 11 mainly has a compressor 12, a heat-source-side heat exchanger 13, an expansion mechanism 14, and a usage-side heat exchanger 15. The refrigerant circuit 11 is structured by sequentially connecting these units 12 to 15, and the like. The refrigerant circuit 11 uses the mixture of fluorinated hydrocarbons described above as a refrigerant; the refrigerant circulates in the direction indicated by the solid arrow in FIG. 8.

The compressor 12 is a unit for compressing the low-pressure gaseous refrigerant and discharging a high-temperature, high-pressure gaseous refrigerant, and is disposed outside of a storehouse or a room. The high-pressure gaseous refrigerant discharged from the compressor 12 is supplied to the heat-source-side heat exchanger 13.

The heat-source-side heat exchanger 13 is a unit for condensing (liquefying) the high-temperature, high-pressure gaseous refrigerant compressed by the compressor 12, and is disposed outside of a storehouse or a room. The high-pressure liquid refrigerant discharged from the heat-source-side heat exchanger 13 passes through the expansion mechanism 14.

Figure 9:
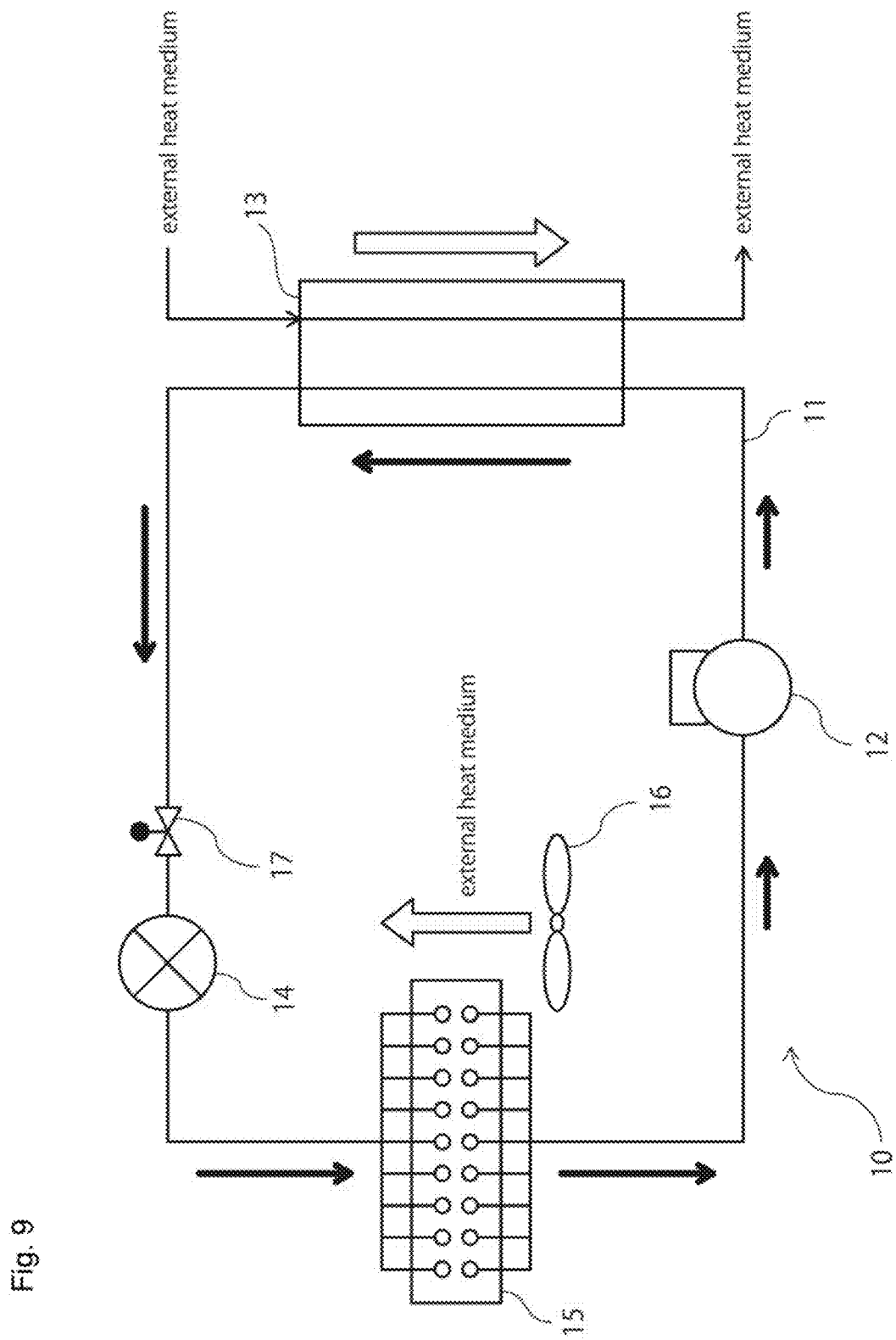
FIG. 9: A schematic view showing a modification of the refrigerant circuit in FIG. 8.

The expansion mechanism 14 is a unit for decreasing the pressure of the high-pressure liquid refrigerant, which underwent heat dissipation in the heat-source-side heat exchanger 13, to a low pressure in the refrigeration cycle, and is disposed inside of a storehouse or a room. For example, an electronic expansion valve may be used as the expansion mechanism 14; however, as shown in FIG. 9, a temperature-sensitive expansion valve is preferably used. When an electronic expansion valve is used as the expansion mechanism 14, the temperature-sensitive expansion valve becomes capable of detecting the refrigerant temperature after the usage-side heat exchanger 15 using a temperature sensitive tube that is directly connected to the expansion valve, thereby enabling control of the opening degree of the expansion valve according to the detected refrigerant temperature. With this control, for example, when the usage-side heat exchanger 15, the expansion valve, and the temperature sensitive tube are provided inside the usage-side unit, the control of the expansion valve can be completed within the usage-side unit. As a result, the communication relating to the expansion valve between the heat-source-side unit in which the heat-source-side heat exchanger 13 is provided, and the usage-side unit, becomes unnecessary, thereby reducing costs and construction work. When a temperature-sensitive expansion valve is used as the expansion mechanism 14, a solenoid valve 17 is disposed on the side of the heat-source-side heat exchanger 13 in the expansion mechanism 14. The low-pressure liquid refrigerant that has passed through the expansion mechanism 14 is supplied to the usage-side heat exchanger 15.

The usage-side heat exchanger 15 is a unit for evaporating (gasifying) a low-pressure liquid refrigerant, and is disposed inside of a storehouse or a room. The low-pressure gaseous refrigerant discharged from the usage-side heat exchanger is supplied to the compressor 12, and circulates in the refrigerant circuit 11 again.

In the refrigeration unit (cooling system), the heat-source-side heat exchanger 13 functions as a condenser, and the usage-side heat exchanger 15 functions as an evaporator.

In the refrigeration unit (cooling system) of the first embodiment, the two heat exchangers, i.e., the heat-source-side heat exchanger 13 and the usage-side heat exchanger 15 serve as countercurrent-type heat exchangers. In FIGS. 8 and 9, and also in FIG. 10 to FIG. 15 described below, the heat-source-side heat exchanger 13 is constituted of a heat exchanger using water as an external heat medium (for example, a double-pipe heat exchanger), and the usage-side heat exchanger 15 is constituted of a heat exchanger using air as an external heat medium (for example, a finned tube-type heat exchanger); however, the present invention is not limited to this structure. The heat-source-side heat exchanger 13 may be constituted of a heat exchanger using air as an external heat medium, and the usage-side heat exchanger 15 may be constituted of a heat exchanger using water as an external heat medium. Further, both of the heat-source-side heat exchanger 13 and the usage-side heat exchanger 15 may be constituted of a heat exchanger using air as an external heat medium, and both may be constituted of a heat exchanger using water as an external heat medium.

In the refrigeration unit (cooling system) according to the second embodiment, the evaporation temperature of the refrigerant when the usage-side heat exchanger 15 functions as an evaporator is 0° C. or less. In the refrigeration unit (cooling system) according to the second embodiment, it is not always necessary to use countercurrent-type heat exchangers for the heat-source-side heat exchanger 13 and the usage-side heat exchanger 15.

In the refrigeration unit (cooling system) according to the third embodiment, the two heat exchangers, i.e., the heat-source-side heat exchanger 13 and the usage-side heat exchanger serve as countercurrent-type heat exchangers, and the evaporation temperature of the refrigerant when the usage-side heat exchanger 15 functions as an evaporator is 0° C. or less.

Figure 10:
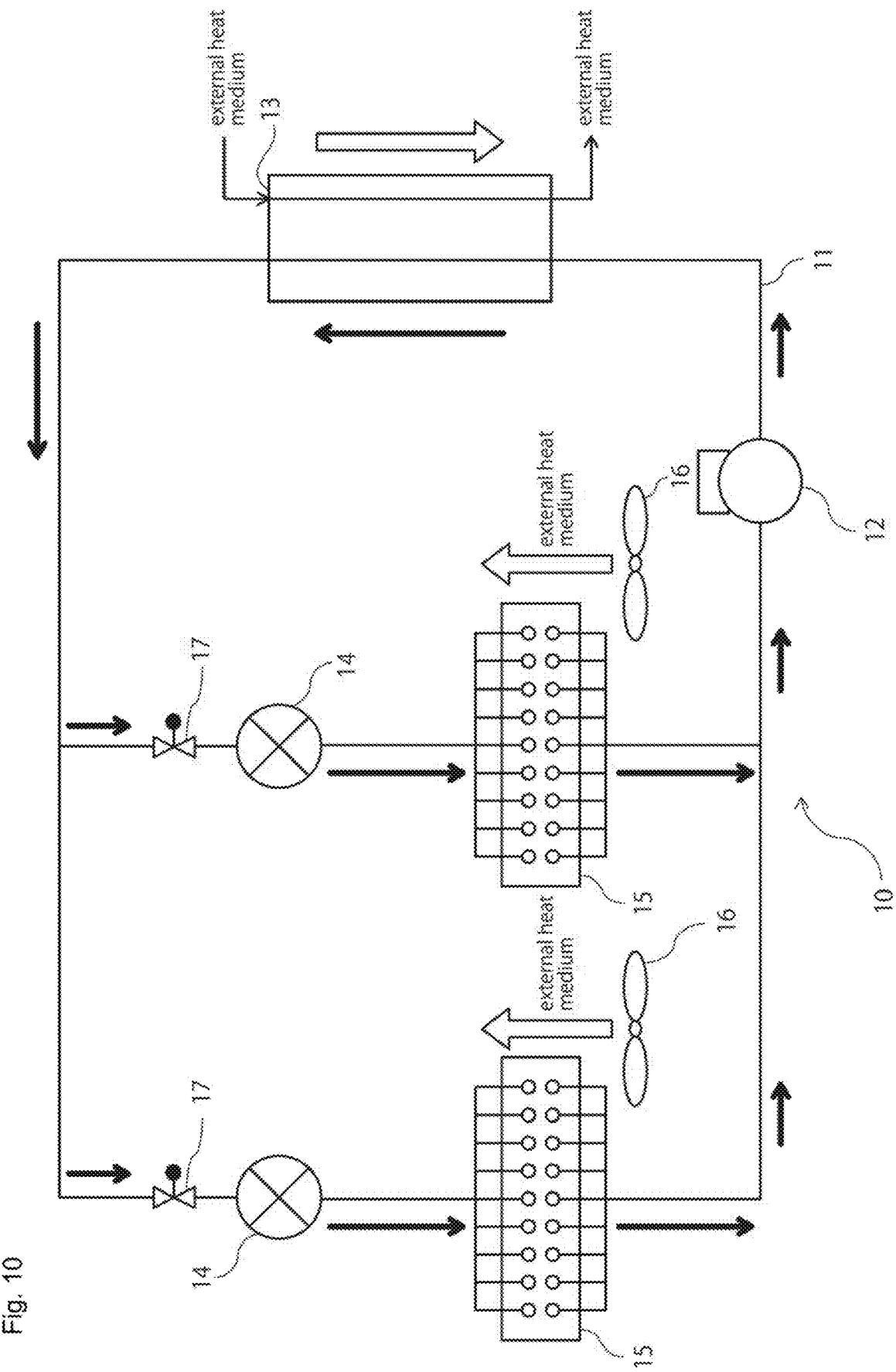
FIG. 10: A schematic view showing a modification of the refrigerant circuit in FIG. 9.

In the refrigeration unit (cooling system) 10 having the above structure, as shown in FIG. 10, the refrigerant circuit 11 may have a plurality of (two in FIG. 10) expansion mechanisms 14 and usage-side heat exchangers 15 in parallel.

Figure 11:
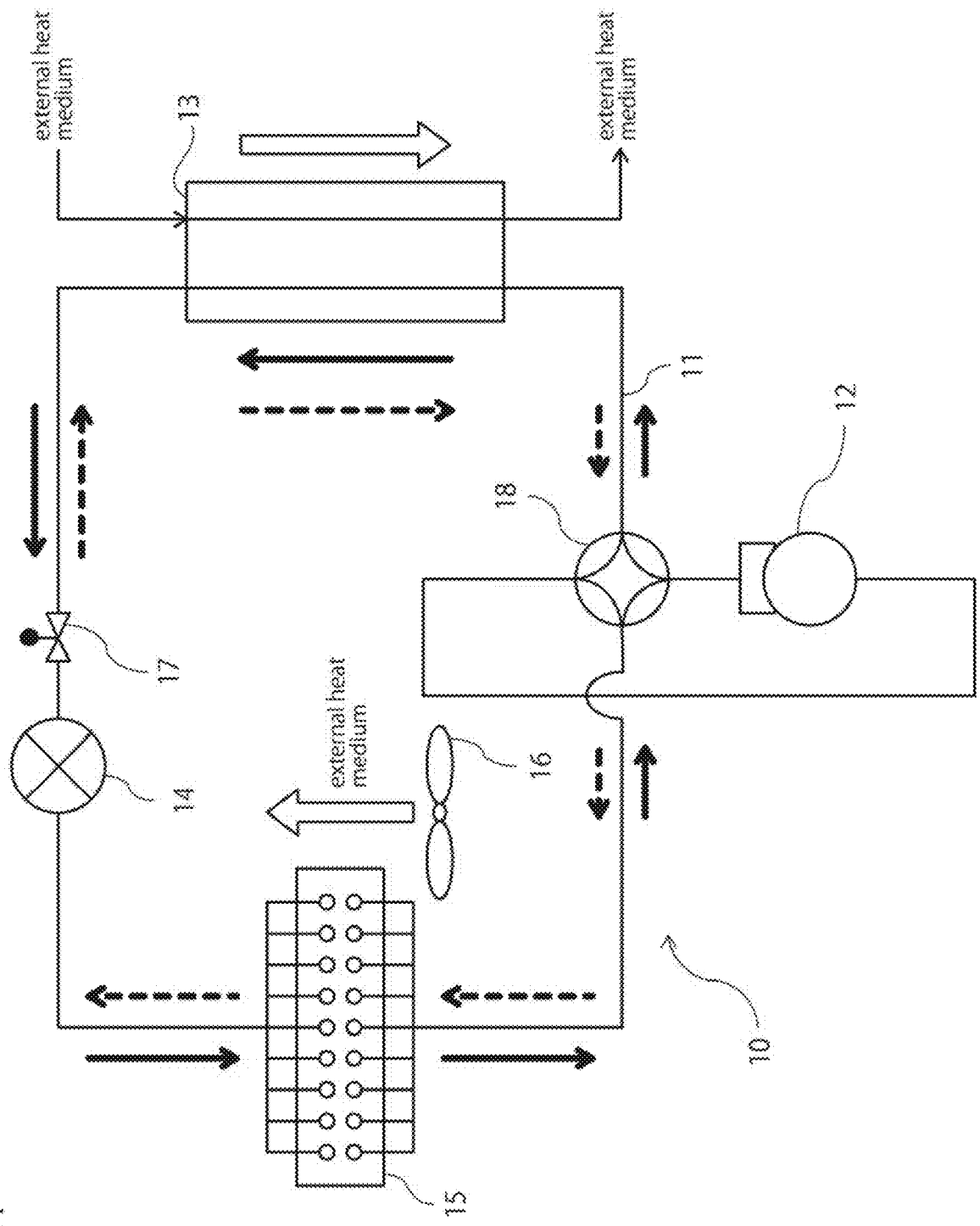
FIG. 11: A schematic view showing a modification of the refrigerant circuit in FIG. 9.

In the refrigeration unit (cooling system) 10 having the above structure, as shown in FIG. 11, the refrigerant circuit 11 may further comprise a four-way switching valve 18 that switches the flow of the high temperature and high pressure gaseous refrigerant compressed by the compressor 12 between the heat-source-side heat exchanger 13 and the usage-side heat exchanger 15. The four-way switching valve 18 is capable of switching between normal-cycle operation (the direction indicated by the solid arrow) in which the heat-source-side heat exchanger 13 functions as a radiator and the usage-side heat exchanger 15 functions as an evaporator, and reverse-cycle operation (the direction indicated by the solid arrow) in which the heat-source-side heat exchanger 13 functions as an evaporator and the usage-side heat exchanger 15 functions as a radiator.

Further, in the refrigeration unit (cooling system) 10 having the above structure, when the refrigerant evaporation temperature in the usage-side heat exchanger 15 (evaporator) is 0° C. or less, frost may form in the usage-side heat exchanger 15 (evaporator). Frost formation results in a decrease in heat exchange efficiency of the usage-side heat exchanger 15 (evaporator), thereby causing an increase in power consumption or a decrease in cooling capacity. Therefore, it is preferable to remove the frost attached to the usage-side heat exchanger 15 (evaporator) by performing defrosting under predetermined conditions.

Figure 12:
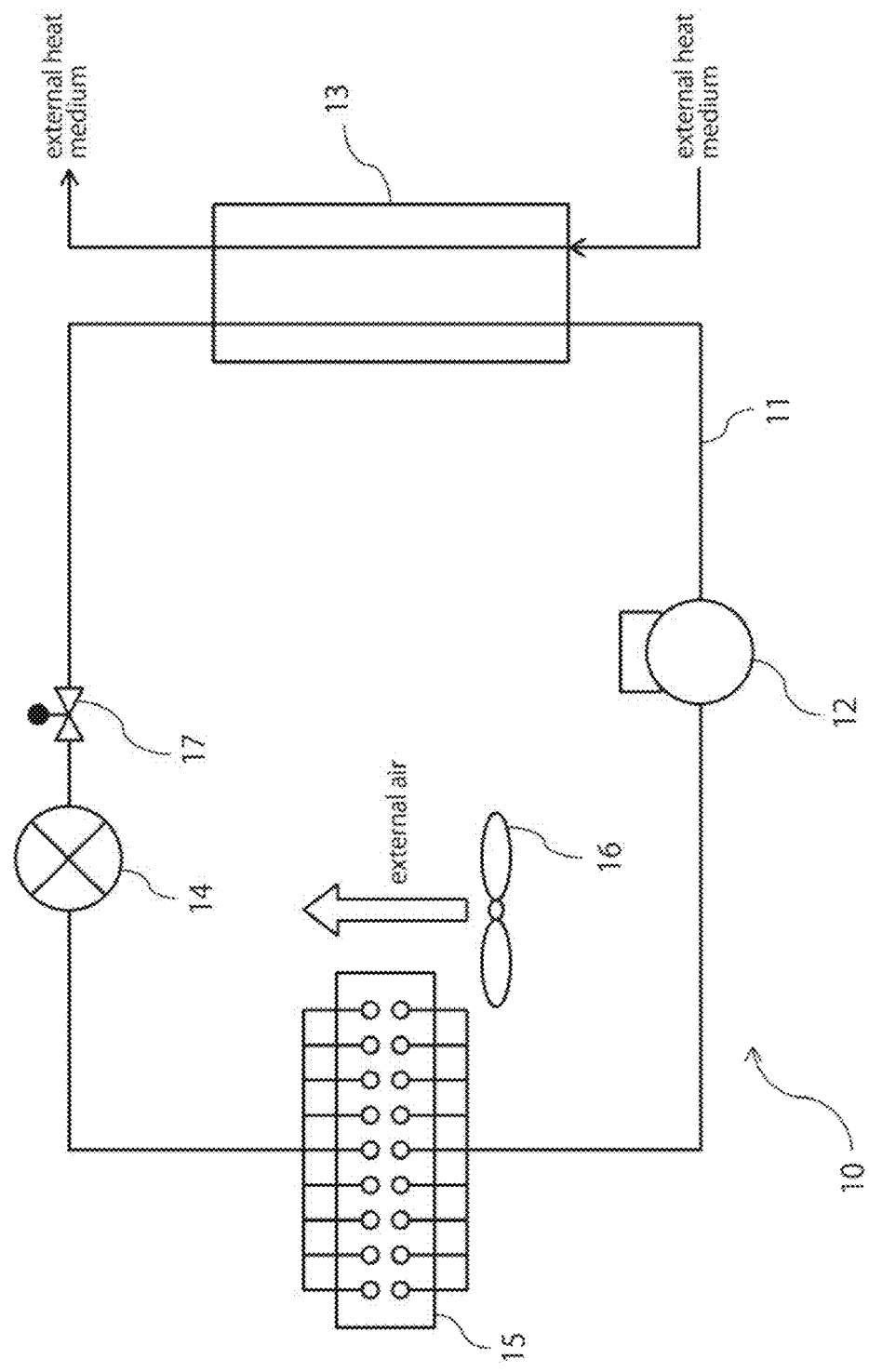
FIG. 12: A schematic view showing off-cycle defrosting.

As shown in FIG. 12, off-cycle defrosting in which the operation of the compressor 12 is stopped and a fan 16 is operated without circulating a refrigerant in the usage-side heat exchanger 15 may be performed as defrosting. In the off-cycle defrosting, external air is sent to the usage-side heat exchanger 15 by the fan 16, thereby defrosting the usage-side heat exchanger 15. When the usage-side heat exchanger 15 is constituted of a heat exchanger that uses water as an external heat medium, the fan 16 is additionally provided in the usage-side heat exchanger 15.

Figure 13:
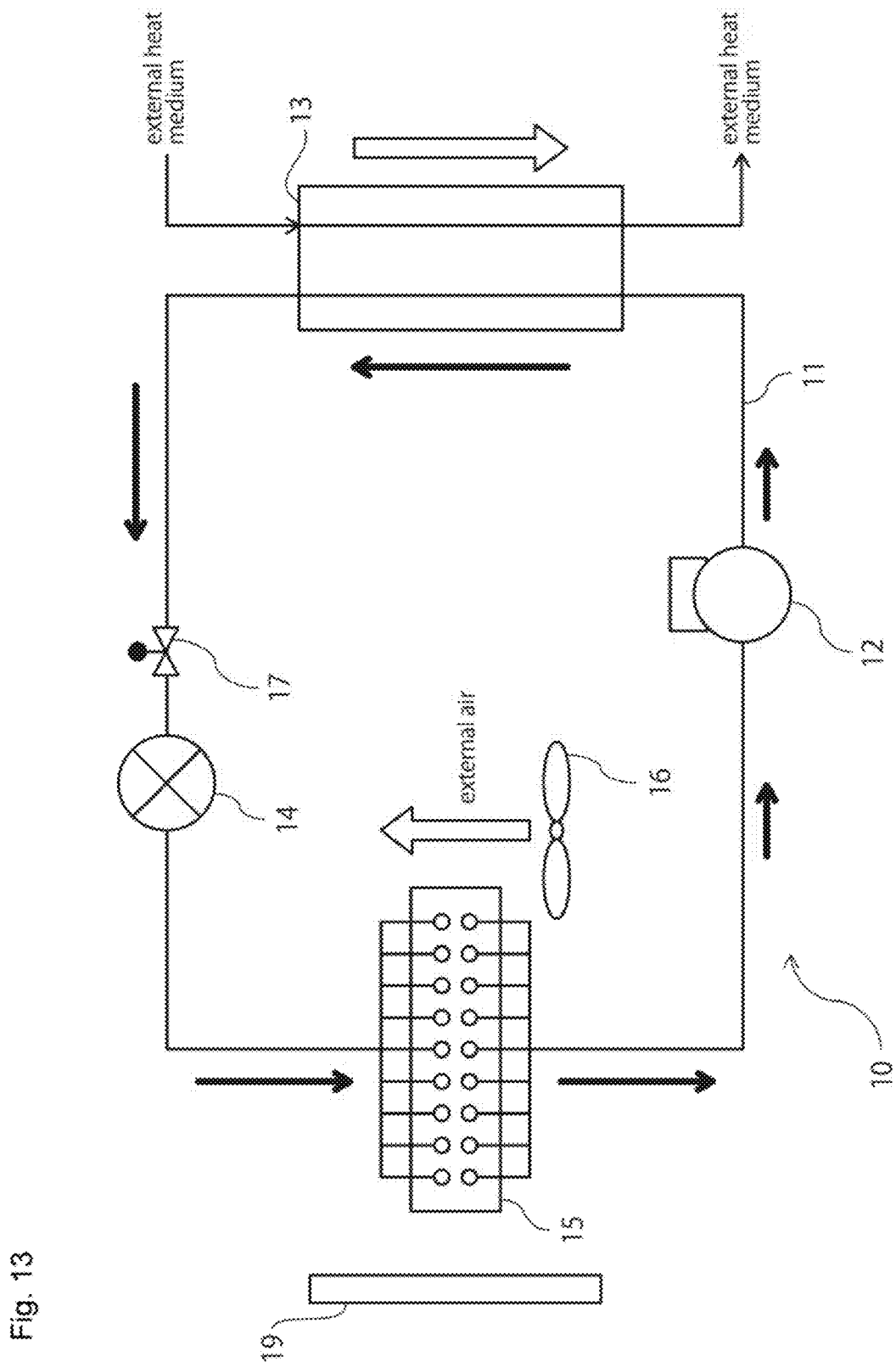
FIG. 13: A schematic view showing heating defrosting.

Further, as shown in FIG. 13, by using a refrigeration unit (cooling system) 10 further comprising a heating means 19 for heating the usage-side heat exchanger 15, heating defrosting may be performed by operating the heating means 19. In the heating defrosting, the usage-side heat exchanger 15 is heated by the heating means 19 to melt the frost attached thereto, thereby defrosting the usage-side heat exchanger 15. Examples of the heating means 19 include an electric heater.

Figure 14:
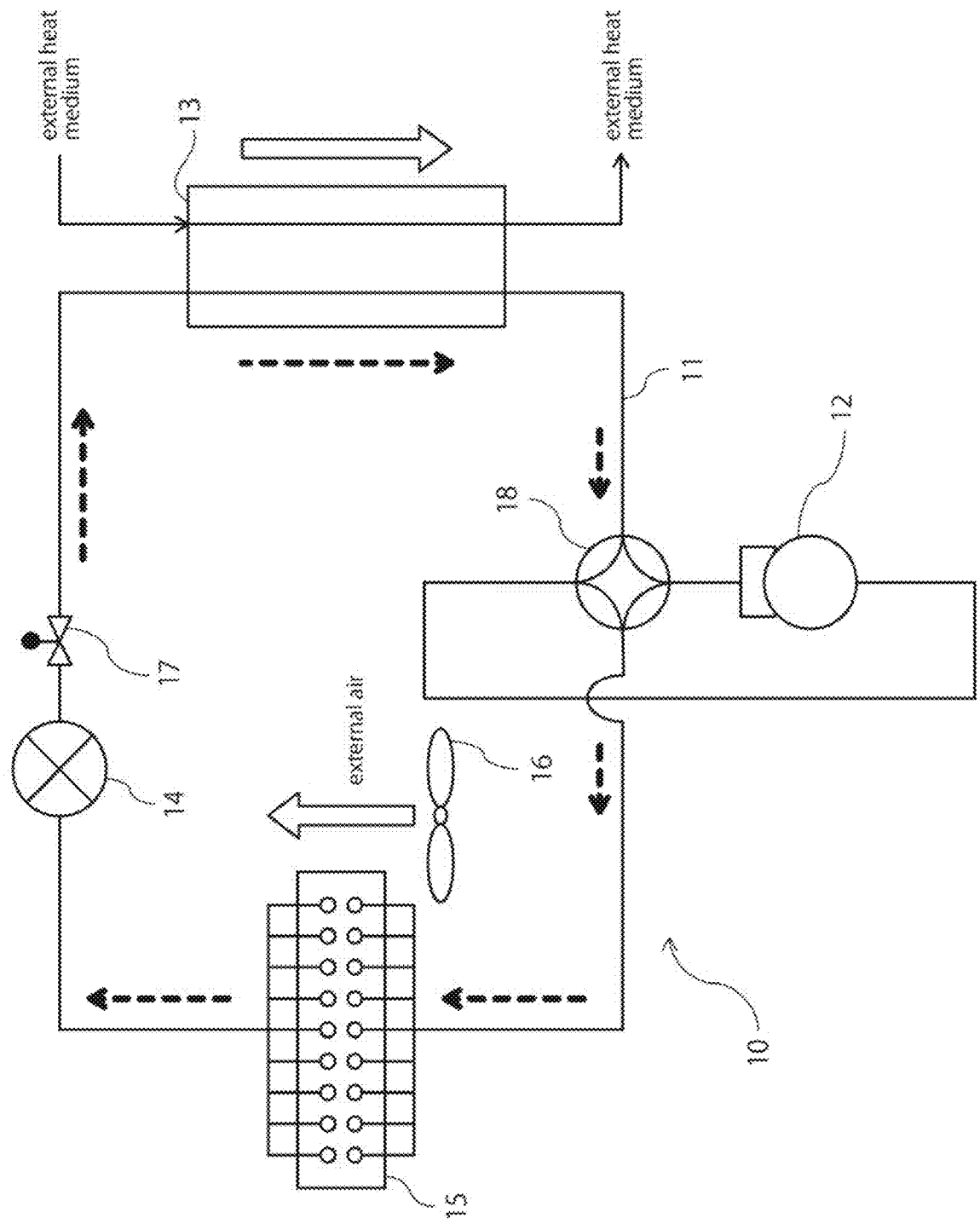
FIG. 14: A schematic view showing reverse-cycle hot gas defrosting.

Further, as shown in FIG. 14, reverse-cycle hot gas defrosting in which the reverse-cycle operation described above is operated may be performed as defrosting. When reverse-cycle operation is performed, the high-temperature, high-pressure gaseous refrigerant compressed by the compressor 12 is supplied to the usage-side heat exchanger 15, thereby melting the frost attached to the usage-side heat exchanger 15, thus defrosting the usage-side heat exchanger 15.

Figure 15:
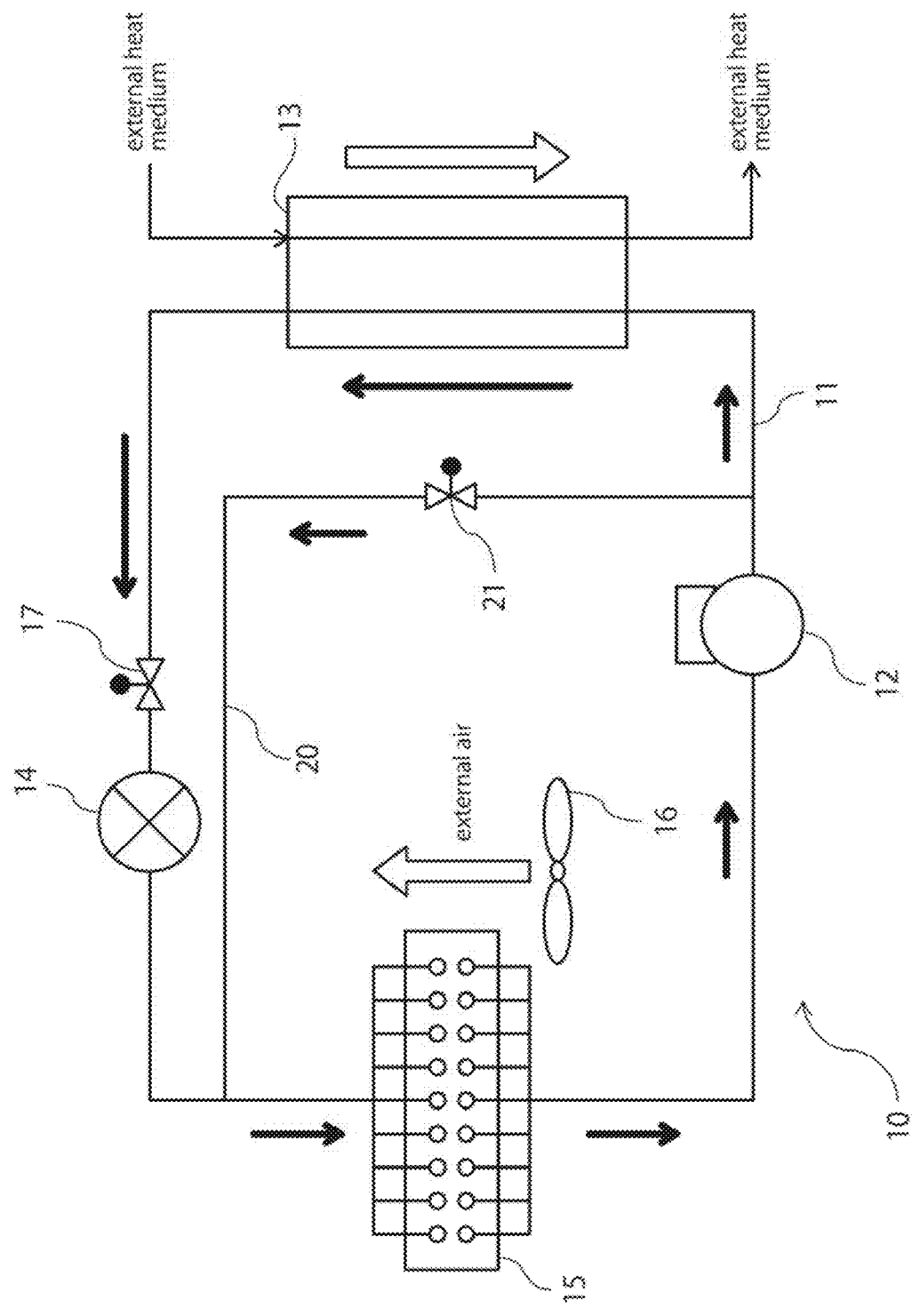
FIG. 15: A schematic view showing normal-cycle hot gas defrosting.

Further, as shown in FIG. 15, normal-cycle hot gas defrosting may also be performed as defrosting. In FIG. 15, the refrigerant circuit 11 comprises a bypass flow path 20 having a first end connected to a discharge end of the compressor 12 and a second end connected to an inflow end of the usage-side heat exchanger 15. In normal-cycle hot gas defrosting, the bypass valve 21 is opened while circulating the refrigerant, and the high-temperature, high-pressure gaseous refrigerant compressed by the compressor 12 is directly supplied to the usage-side heat exchanger 15 via the bypass flow path 20. As a result, the frost attached to the usage-side heat exchanger 15 is melted, thereby defrosting the usage-side heat exchanger 15. It is also possible to bypass the high-temperature, high-pressure gaseous refrigerant compressed by the compressor 12 to the inlet side of the usage-side heat exchanger 15 via the expansion mechanism 14 by reducing the pressure.

Regarding the conditions to perform defrosting, the defrosting may be performed in response to specific conditions, for example, by detecting the inflow refrigerant temperature in the usage-side heat exchanger 15 and the external temperature using a temperature sensor or the like (not shown), determining the presence/absence of the frost formation in the usage-side heat exchanger 15 based on the detected temperature by a control unit or the like, and performing defrosting when it is determined that frost has formed.

The refrigeration unit according to the present invention may be suitably used for a transportation refrigeration unit provided in a delivery container for use in land transportation or marine shipping, or a refrigeration unit for a showcase provided in a refrigerating or freezing showcase in a store.

Example 1

The present invention is described in detail below with reference to Examples. However, the present invention is not limited to the Examples.

Examples 1 to 13 and Comparative Examples 1 to 12

The GWP of each of R404A and mixed refrigerants of R32, R125, and R134a was evaluated based on the values described in the Intergovernmental Panel on Climate Change (IPCC) fourth report.

The COP and refrigerating capacity of each of R404A and the mixed refrigerants of R32, R125, and R134a were determined by performing refrigeration cycle theoretical calculations for the refrigerant and mixed refrigerants using the National Institute of Science and Technology (NIST) and Reference Fluid Thermodynamic and Transport Properties Database (Refprop 9.0) under the following conditions.

| Evaporation temperature | −40° C. |
|---|---|
| Condensation temperature | 40° C. |
| Superheating temperature | 20 K |
| Supercooling temperature | 0 K |
| Compressor efficiency | 70% |

In FIG. 1, the formulations of the compositions of the Examples are indicated by solid triangles (▲).

Tables 1 and 2 show the GWP, COP, and refrigerating capacity calculated based on these results. Regarding the COP and refrigerating capacity, the percentages relative to those of R404A are shown.

The coefficient of performance (COP) was calculated according to the following equation.

COP=(refrigerating capacity or heating capacity)/amount of electrical power consumed The flammability of the mixture of the three basic components used in the composition was evaluated according to U.S. ASHRAE Standard 34-2013. The flammable range was measured using a measurement device according to ASTM E681-09. FIG. 2 denotes a non-flammable border line (P), a flammable region (Q), and a non-flammable region (R).

A 12-L spherical glass flask was used so that the combustion state could be visually observed and photographically recorded. When excessive pressure was generated by combustion, gas was allowed to escape from the upper lid. Ignition was achieved by electric discharge from electrodes disposed at one-third the distance from the bottom.

Test Conditions

Test vessel: 280 mm φ spherical (internal volume: 12 liters)
Test temperature: 60° C.±3° C.
Pressure: 101.3 kPa±0.7 kPa
Water: 0.0088 g±0.0005 g per gram of dry air
Mixing ratio of composition/air: 1 vol. % increments±0.2 vol. %
Composition mixture: ±0.1 wt %
Ignition method: AC discharge, voltage: 15 kV, electric current: 30 mA, neon transformer
Electrode spacing: 6.4 mm (¼ inch)
Spark: 0.4 seconds±0.05 seconds
Evaluation criteria: When the flame propagation extends at an angle of 90° or more from the ignition point, it was evaluated as flammable (propagation).

The composition ratio of R32, R125, and R134a (x/y/z wt %) in the non-flammability limit almost satisfied the relationship represented by the following equations (1) to (3).

$$19 \leq x \leq 61 \tag{1}$$

$$y = 0.9286x - 17.643 \tag{2}$$

$$z = 100 - x - y \tag{3}$$

The results revealed that the composition of the present invention is non-flammable, and causes no combustion, even when mixed with air at any ratio.

TABLE 1

| Item | | Unit | R404A | Comparative Example 1 Point A | Example 1 Point B | Example 2 Point C | Example 3 Point D | Example 4 Point E | Example 5 Point F | Example 6 Point G |
|---|---|---|---|---|---|---|---|---|---|---|
| Composition | R32 | wt % | 0 | 37.3 | 34.0 | 33.3 | 32.7 | 31.7 | 30.7 | 29.4 |
| | R125 | wt % | 44.0 | 17.0 | 13.9 | 15.5 | 12.8 | 14.9 | 10.9 | 14.1 |
| | R134a | wt % | 4.0 | 45.7 | 52.1 | 51.2 | 54.5 | 53.4 | 58.4 | 56.5 |
| | R143a | wt % | 52.0 | 0 | 0 | 0 | 0 | 0 | 0 | 0 |
| GWP | | year | 3922 | 1500 | 1461 | 1499 | 1448 | 1499 | 1424 | 1500 |
| Coefficient of performance | | % (relative to that of R404A) | 100.0 | 111.3 | 111.9 | 111.7 | 112.1 | 111.8 | 112.4 | 112.0 |
| Refrigerating capacity | | % (relative to that of R404A) | 100.0 | 106.2 | 100.0 | 100.0 | 97.5 | 97.5 | 94.0 | 94.0 |
| Compressor outlet temperature | | ° C. | 92.6 | 139.9 | 137.7 | 136.7 | 136.7 | 135.4 | 135.3 | 133.4 |
| Condenser temperature glide | | ° C. | 0.3 | 4.7 | 5.0 | 5.0 | 5.1 | 5.1 | 5.2 | 5.2 |
| Evaporator temperature glide | | ° C. | 0.4 | 4.2 | 4.2 | 4.2 | 4.2 | 4.1 | 4.1 | 4.1 |
| Flammability | | — | | nonflammable | nonflammable | nonflammable | nonflammable | nonflammable | nonflammable | nonflammable | nonflammable |

TABLE 2

| Item | | Unit | Example 7 Point A' | Example 8 Point B' | Example 9 Point D' | Example 10 Point F' | Example 11 Within □ B'CED | Example 12 Within △ A'GF' | Comparative Example 2 | Comparative Example 3 | Comparative Example 4 |
|---|---|---|---|---|---|---|---|---|---|---|---|
| Composition | R32 | wt % | 35.6 | 33.7 | 32.4 | 30.4 | 32.5 | 30.5 | 30.0 | 35.0 | 28.0 |
| | R125 | wt % | 16.4 | 14.6 | 13.4 | 11.5 | 15.0 | 13.0 | 20.0 | 10.0 | 12.0 |
| | R134a | wt % | 48 | 51.7 | 54.2 | 58.1 | 52.5 | 56.5 | 50.0 | 55.0 | 60.0 |
| | R143a | wt % | 0 | 0 | 0 | 0 | 0 | 0 | 0 | 0 | 0 |
| GWP | | year | 1500 | 1478 | 1463 | 1438 | 1495 | 1469 | 1618 | 1373 | 1467 |
| Coefficient of performance | | % (relative to that of R404A) | 111.5 | 111.8 | 112.0 | 112.3 | 111.8 | 112.1 | 111.2 | 112.3 | 112.3 |
| Refrigerating capacity | | % (relative to that of R404A) | 103.6 | 100.0 | 97.6 | 94.0 | 98.7 | 94.9 | 98.2 | 99.0 | 91.1 |
| Compressor outlet temperature | | ° C. | 138.5 | 137.2 | 136.3 | 134.9 | 136.3 | 134.7 | 132.6 | 139.5 | 132.6 |

TABLE 2-continued

| Item | Unit | Example 7 Point A' | Example 8 Point B' | Example 9 Point D' | Example 10 Point F' | Example 11 Within ☐ B'CED | Example 12 Within Δ A'GF' | Comparative Example 2 | Comparative Example 3 | Comparative Example 4 |
|---|---|---|---|---|---|---|---|---|---|---|
| Condenser temperature glide | ° C. | 4.8 | 5.0 | 5.1 | 5.2 | 5.0 | 5.2 | 5.0 | 5.1 | 5.3 |
| Evaporator temperature glide | ° C. | 4.2 | 4.2 | 4.2 | 4.1 | 4.2 | 4.1 | 4.1 | 4.2 | 4.0 |
| Flammability | — | nonflammable | nonflammable | nonflammable | nonflammable | nonflammable | nonflammable | nonflammable | flammable | nonflammable |

In Comparative Example 1, the compressor outlet temperature was too high, i.e., about 140° C. In Comparative Example 2, the GWP exceeded 1500. The composition of Comparative Example 3 was flammable. In Comparative Example 4, the refrigerating capacity was low, i.e., 91%.

DESCRIPTION OF REFERENCE NUMERALS

A: Composition ratio of Comparative Example 1
B: Composition ratio of Example 1
C: Composition ratio of Example 2
D: Composition ratio of Example 3
E: Composition ratio of Example 4
F: Composition ratio of Example 5
G: Composition ratio of Example 6
A': Composition ratio of Example 7
B': Composition ratio of Example 8
D': Composition ratio of Example 9
F': Composition ratio of Example 10
L: Approximation line segment of line segment indicating GWP=1500
X: Approximation line segment of line segment indicating a composition ratio at which the refrigerating capacity is 94% (relative to that of R404A)
Y: Approximation line segment of line segment indicating a composition ratio at which the refrigerating capacity is 97.5% (relative to that of R404A)
Z: Approximation line segment of line segment indicating a composition ratio at which the refrigerating capacity is 100% (relative to that of R404A)
P: ASHRAE non-flammable border line
P': ASHRAE non-flammable border line when the allowable range is set to ±0.5%
Q: ASHRAE flammable region
R: ASHRAE non-flammable region
1: Ignition source
2: Sample inlet
3: Springs
4: 12-liter glass flask
5: Electrodes
6: Stirrer
7: Insulated chamber
10: Refrigeration unit
11: Refrigerant circuit
12: Compressor
13: Heat-source-side heat exchanger
14: Expansion mechanism
15: Usage-side heat exchanger
16: Fan
17: Solenoid valve
18: Four-way switching valve
19: Heating means
20: Bypass flow path

The invention claimed is:

1. A method for using a mixture of fluorinated hydrocarbons as a refrigerant,
   (1) the mixture comprising difluoromethane (R32), pentafluoroethane (R125) and 1,1,1,2-tetrafluoroethane (R134a) in amounts such that the sum of the concentrations thereof is 99.5 wt % or more;
   (2) the composition ratio of the fluorinated hydrocarbons contained in the mixture falling within a quadrilateral having, as vertices, the following four points in a ternary composition diagram in which the sum of the concentrations of R32, R125, and R134a is 100 wt %,
   point B (R32/R125/R134a=34.0/13.9/52.1 wt %),
   point C (R32/R125/R134a=33.3/15.5/51.2 wt %),
   point E (R32/R125/R134a=31.7/14.9/53.4 wt %), and
   point D (R32/R125/R134a=32.7/12.8/54.5 wt %); and
   (3) the mixture being used as a refrigerant in a cooling system comprising a heat exchanger in which a flow of the refrigerant and a flow of an external heat medium are counter flows.

2. The method according to claim 1, the mixture being used as a refrigerant in a cooling system comprising a heat exchanger in which a flow of the refrigerant and a flow of an external heat medium are counter flows, and an evaporation temperature of the refrigerant when a usage-side heat exchanger functions as an evaporator being 0° C. or less.

3. The method according to claim 1, wherein:
   the heat exchanger comprises a heat-source-side heat exchanger and a usage-side heat exchanger,
   the cooling system comprises a refrigerant circuit comprising a compressor, the heat-source-side heat exchanger, an expansion mechanism, and the usage-side heat exchanger in this order;
   the expansion mechanism is a temperature-sensitive expansion valve; and
   the refrigerant circuit comprises a solenoid valve between the heat-source-side heat exchanger and the temperature-sensitive expansion valve, and the heat-source-side heat exchanger functions as a radiator and the usage-side heat exchanger functions as an evaporator.

4. The method according to claim 1, wherein the cooling system comprises a refrigerant circuit comprising a compressor, a heat-source-side heat exchanger, an expansion mechanism, and a usage-side heat exchanger in this order;
   the refrigerant circuit comprises a four-way switching valve for switching the flow of the refrigerant compressed by the compressor between the heat-source-side heat exchanger and the usage-side heat exchanger; and
   the four-way switching valve is capable of switching normal-cycle operation in which the heat-source-side heat exchanger functions as a radiator and the usage-side heat exchanger functions as an evaporator, and reverse-cycle operation in which the heat-source-side heat exchanger functions as an evaporator and the usage-side heat exchanger functions as a radiator.

5. The method according to claim 3, wherein the cooling system performs off-cycle defrosting in which the operation of the compressor is stopped and a usage-side fan additionally provided in the usage-side heat exchanger is operated, under predetermined conditions.

6. The method according to claim 3, wherein the cooling system further comprises a heating means for heating the usage-side heat exchanger, and performs heating defrosting in which the usage-side heat exchanger is heated by the heating means, under predetermined conditions.

7. The method according to claim 4, wherein the cooling system performs reverse-cycle hot gas defrosting by the reverse-cycle operation, under predetermined conditions.

8. The method according to claim 3, wherein the refrigerant circuit comprises a bypass flow path having a first end connected to a discharge end of the compressor and a second end connected to an inflow end of the usage-side heat exchanger; and
the cooling system performs normal-cycle hot gas defrosting in which the refrigerant compressed by the compressor is introduced into the usage-side heat exchanger via the bypass flow path, under predetermined conditions.

9. The method according to claim 1, wherein the mixture consists only of R32, R125, and R134a.

10. The method according to claim 1, wherein the mixture is an alternative refrigerant for R404A (R125/R134a/R143a=44/4/52 wt %), which is a mixed refrigerant.

11. The method according to claim 1, wherein the method is performed in the presence of refrigerant oil.

12. A method for using a mixture of fluorinated hydrocarbons as a refrigerant,
 (1) the mixture comprising difluoromethane (R32), pentafluoroethane (R125) and 1,1,1,2-tetrafluoroethane (R134a) in amounts such that the sum of the concentrations thereof is 99.5 wt % or more;
 (2) the composition ratio of the fluorinated hydrocarbons contained in the mixture falling within a triangle having, as vertices, the following three points in a ternary composition diagram in which the sum of the concentrations of R32, R125, and R134a is 100 wt %,
 point A'(R32/R125/R134a=35.6/16.4/48.0 wt %),
 point F'(R32/R125/R134a=30.4/11.5/58.1 wt %), and
 point G (R32/R125/R134a=29.4/14.1/56.5 wt %); and
 (3) the mixture being used as a refrigerant in a cooling system comprising a heat exchanger in which a flow of the refrigerant and a flow of an external heat medium are counter flows.

13. A method for using a mixture of fluorinated hydrocarbons as a refrigerant,
 (1) the mixture comprising difluoromethane (R32), pentafluoroethane (R125) and 1,1,1,2-tetrafluoroethane (R134a) in amounts such that the sum of the concentrations thereof is 99.5 wt % or more;
 (2) the composition ratio of the fluorinated hydrocarbons contained in the mixture falling within a quadrilateral having, as vertices, the following four points in a ternary composition diagram in which the sum of the concentrations of R32, R125, and R134a is 100 wt %,
 point B'(R32/R125/R134a=33.7/14.6/51.7 wt %),
 point C (R32/R125/R134a=33.3/15.5/51.2 wt %),
 point E (R32/R125/R134a=31.7/14.9/53.4 wt %), and
 point D' (R32/R125/R134a=32.4/13.4/54.2 wt %); and
 (3) the mixture being used as a refrigerant in a cooling system comprising a heat exchanger in which a flow of the refrigerant and a flow of an external heat medium are counter flows.

14. A refrigeration unit using a mixture of fluorinated hydrocarbons as a refrigerant,
 (1) the mixture comprising difluoromethane (R32), pentafluoroethane (R125) and 1,1,1,2-tetrafluoroethane (R134a) in amounts such that the sum of the concentrations thereof is 99.5 wt % or more;
 (2) the composition ratio of the fluorinated hydrocarbons contained in the mixture falling within a quadrilateral having, as vertices, the following four points in a ternary composition diagram in which the sum of the concentrations of R32, R125, and R134a is 100 wt %,
 point B (R32/R125/R134a=34.0/13.9/52.1 wt %),
 point C (R32/R125/R134a=33.3/15.5/51.2 wt %),
 point E (R32/R125/R134a=31.7/14.9/53.4 wt %), and
 point D (R32/R125/R134a=32.7/12.8/54.5 wt %); and
 (3) the refrigeration unit comprising a heat exchanger in which a flow of the refrigerant and a flow of an external heat medium are counter flows.

15. The refrigeration unit according to claim 14, wherein the refrigeration unit comprising a refrigerant circuit, which comprises a compressor, a heat-source-side heat exchanger, an expansion mechanism, and a usage-side heat exchanger in this order, and circulates the mixture as a refrigerant,
 the heat-source-side heat exchanger and the usage-side heat exchanger serving as heat exchangers in which a flow of the refrigerant and a flow of an external heat medium are counter flows, and
 the evaporation temperature of the refrigerant when the usage-side heat exchanger functions as an evaporator being 0° C. or less.

16. The refrigeration unit according to claim 15, wherein the expansion mechanism is a temperature-sensitive expansion valve;
 the refrigerant circuit comprises a solenoid valve between the heat-source-side heat exchanger and the temperature-sensitive expansion valve; and
 the heat-source-side heat exchanger functions as a radiator, and the usage-side heat exchanger functions as an evaporator.

17. The refrigeration unit according to claim 15, wherein the refrigerant circuit comprises a four-way switching valve for switching the flow of the refrigerant compressed by the compressor between the heat-source-side heat exchanger and the usage-side heat exchanger; and
 the four-way switching valve is capable of switching normal-cycle operation in which the heat-source-side heat exchanger functions as a radiator and the usage-side heat exchanger functions as an evaporator, and reverse-cycle operation in which the heat-source-side heat exchanger functions as an evaporator and the usage-side heat exchanger functions as a radiator.

18. The refrigeration unit according to claim 15, wherein off-cycle defrosting in which the operation of the compressor is stopped and a usage-side fan additionally provided in the usage-side heat exchanger is operated is performed under predetermined conditions.

19. The refrigeration unit according to claim 15, wherein the refrigeration unit further comprises a heating means for heating the usage-side heat exchanger, and heating defrosting in which the usage-side heat exchanger is heated by the heating means is performed under predetermined conditions.

20. The refrigeration unit according to claim 17, wherein reverse-cycle hot gas defrosting by the reverse-cycle operation is performed under predetermined conditions.

21. The refrigeration unit according to claim 15, wherein the refrigerant circuit comprises a bypass flow path having a first end connected to a discharge end of the compressor and a second end connected to an inflow end of the usage-side heat exchanger; and normal-cycle hot gas defrosting in which the refrigerant compressed by the compressor is introduced into the usage-side heat exchanger via the bypass flow path is performed, under predetermined conditions.

22. The refrigeration unit according to claim 14, wherein the refrigeration unit is a transportation refrigeration unit or a refrigeration unit for a showcase.

23. A refrigeration unit using a mixture of fluorinated hydrocarbons as a refrigerant,
   (1) the mixture comprising difluoromethane (R32), pentafluoroethane (R125) and 1,1,1,2-tetrafluoroethane (R134a) in amounts such that the sum of the concentrations thereof is 99.5 wt % or more;
   (2) the composition ratio of the fluorinated hydrocarbons contained in the mixture falling within a triangle having, as vertices, the following three points in a ternary composition diagram in which the sum of the concentrations of R32, R125, and R134a is 100 wt %,
   point A'(R32/R125/R134a=35.6/16.4/48.0 wt %),
   point F'(R32/R125/R134a=30.4/11.5/58.1 wt %), and
   point G (R32/R125/R134a=29.4/14.1/56.5 wt %); and
   (3) the refrigeration unit comprising a heat exchanger in which a flow of the refrigerant and a flow of an external heat medium are counter flows.

24. A refrigeration unit using a mixture of fluorinated hydrocarbons as a refrigerant,
   (1) the mixture comprising difluoromethane (R32), pentafluoroethane (R125) and 1,1,1,2-tetrafluoroethane (R134a) in amounts such that the sum of the concentrations thereof is 99.5 wt % or more;
   (2) the composition ratio of the fluorinated hydrocarbons contained in the mixture falling within a quadrilateral having, as vertices, the following four points in a ternary composition diagram in which the sum of the concentrations of R32, R125, and R134a is 100 wt %,
   point B'(R32/R125/R134a=33.7/14.6/51.7 wt %),
   point C (R32/R125/R134a=33.3/15.5/51.2 wt %),
   point E (R32/R125/R134a=31.7/14.9/53.4 wt %), and
   point D' (R32/R125/R134a=32.4/13.4/54.2 wt %); and
   (3) the refrigeration unit comprising a heat exchanger in which a flow of the refrigerant and a flow of an external heat medium are counter flows.

* * * * *